US006058665A

United States Patent [19]

Halvorson, Jr. et al.

[11] Patent Number: 6,058,665

[45] Date of Patent: May 9, 2000

[54] ADJUSTABLE DOOR AND DOORWAY CONSTRUCTION

[75] Inventors: Harold Halvorson, Jr., Grand Rapids, Mich.; James H. Davies, Toronto; Peter J. Schauer, Scarborough, both of Canada

[73] Assignee: Steelcase Development Inc., Grand Rapids, Mich.

[21] Appl. No.: 09/037,478

[22] Filed: Mar. 10, 1998

[51] Int. Cl.[7] .......... B60J 5/00

[52] U.S. Cl. .......... 52/205; 52/207; 52/126.3; 52/217; 52/656.4; 49/159; 49/176; 49/260; 49/505

[58] Field of Search .......... 52/205, 207, 126.3, 52/126.4, 217, 645, 656.2, 656.4; 49/425, 505, 158, 159, 409, 410, 176, 260; 16/96 R, 103, 104

[56] References Cited

U.S. PATENT DOCUMENTS 869,466 10/1907 Turnbull .......... 49/158
2,766,855 10/1956 Johnson et al. .
3,025,574 3/1962 Finkel .
3,111,208 11/1963 Grossman .
3,136,538 6/1964 Dimmitt et al. .
3,300,897 1/1967 Wikkerink .......... 49/505 X
3,327,428 6/1967 Horton et al. .
3,425,161 2/1969 Catlett et al. .
3,457,674 7/1969 Catlett et al. .
3,464,158 9/1969 Greene .
3,464,162 9/1969 Ingham .
3,466,805 9/1969 Muessel .
3,473,266 10/1969 Miller .
3,491,483 1/1970 Miller .......... 49/410 X
3,591,979 7/1971 Graber .......... 49/409 X
3,605,339 9/1971 Catlett et al. .
3,675,370 7/1972 Catlett .
3,710,839 1/1973 Andres .......... 49/410 X
3,750,334 8/1973 Slaybaugh .
3,812,621 5/1974 Ragland .......... 49/505
3,827,183 8/1974 Zimmerman et al. .
3,834,081 9/1974 Catlett .
3,854,165 12/1974 Haley .
3,879,912 4/1975 Cox .
3,888,046 6/1975 Meisterheim .

(List continued on next page.)

*Primary Examiner*—Beth A. Aubrey
*Assistant Examiner*—Brian E. Glessner
*Attorney, Agent, or Firm*—Price Heneveld Cooper DeWitt & Litton

[57] ABSTRACT

A door and doorway construction includes a doorway structure having a lock jamb, a hinge jamb, and a header defining a doorway opening. An adjustable door is constructed to fit mateably into the doorway opening. The doorway structure includes an overhead expressway construction configured to structurally support a weight of the door and further adapted to carry utilities over the doorway opening. The doorway structure is vertically adjustable to align the expressway construction with adjacent wall units, which results in size changes in the doorway opening, and the door is adjustable to define an adjustable vertical height shaped to fill the doorway opening despite the size changes. In one form the door is pivoted to the doorway structure with hinges located above and below the door and at a centerline of the door. In another form, the door is slidably mounted to the doorway structure by a door-supporting boom that includes a trolley rollingly supported by the doorway structure and a downrigger that is rigidly supported on the trolley. The downrigger pivotally supports the door, and the trolley includes a breakaway latch such that the door can be broken away and pivoted outwardly if the door is pressed on with sufficient force. Additional illustrated door embodiments include a solid wood door and a floor-to-ceiling door that incorporate the above features.

46 Claims, 20 Drawing Sheets

U.S. PATENT DOCUMENTS

| | | | |
|---|---|---|---|
| 3,925,933 | 12/1975 | Reuter . | |
| 4,034,513 | 7/1977 | Richardson . | |
| 4,063,388 | 12/1977 | Little . | |
| 4,103,463 | 8/1978 | Dixon . | |
| 4,149,615 | 4/1979 | Kappenhagen . | |
| 4,198,785 | 4/1980 | Marulic et al. . | |
| 4,277,920 | 7/1981 | Dixon . | |
| 4,283,882 | 8/1981 | Hubbard et al. . | |
| 4,305,227 | 12/1981 | Georgelin . | |
| 4,325,204 | 4/1982 | Martine . | |
| 4,330,972 | 5/1982 | Sailor . | |
| 4,355,486 | 10/1982 | Sherwood . | |
| 4,445,239 | 5/1984 | Jacobsen . | |
| 4,454,690 | 6/1984 | Dixon . | |
| 4,488,378 | 12/1984 | Symon . | |
| 4,535,578 | 8/1985 | Gerken | 52/126.3 X |
| 4,573,287 | 3/1986 | Hagemeyer et al. . | |
| 4,619,075 | 10/1986 | Wiles . | |
| 4,633,614 | 1/1987 | Van Weelden . | |
| 4,726,154 | 2/1988 | Raptis et al. . | |
| 4,821,680 | 4/1989 | Smith et al. . | |
| 4,831,780 | 5/1989 | Bockwinkel . | |
| 4,833,840 | 5/1989 | Kalischewski et al. . | |
| 4,852,303 | 8/1989 | Rolek . | |
| 4,897,889 | 2/1990 | Baus | 52/217 X |
| 4,974,366 | 12/1990 | Tizzoni . | |
| 4,987,638 | 1/1991 | Ribaudo . | |
| 5,070,575 | 12/1991 | Redman et al. . | |
| 5,079,872 | 1/1992 | Short . | |
| 5,127,190 | 7/1992 | Hein et al. . | |
| 5,272,839 | 12/1993 | Karhu . | |
| 5,282,341 | 2/1994 | Baloga et al. . | |
| 5,291,688 | 3/1994 | Pederson | 49/501 |
| 5,293,723 | 3/1994 | Slessor . | |
| 5,355,624 | 10/1994 | Bacon . | |
| 5,394,658 | 3/1995 | Schreiner et al. . | |
| 5,448,869 | 9/1995 | Unruh et al. . | |
| 5,450,693 | 9/1995 | Tarrega . | |
| 5,486,026 | 1/1996 | Borgardt . | |
| 5,511,348 | 4/1996 | Cornell et al. . | |
| 5,524,391 | 6/1996 | Joff et al. . | |
| 5,581,944 | 12/1996 | Kornbrekke et al. . | |
| 5,605,016 | 2/1997 | Pollard . | |
| 5,606,826 | 3/1997 | Calhoun . | |
| 5,638,641 | 6/1997 | Joffe et al. . | |
| 5,651,223 | 7/1997 | Novak et al. . | |
| 5,675,946 | 10/1997 | Verbeek et al. . | |
| 5,845,439 | 12/1998 | Hendley | 52/217 X |

1/20

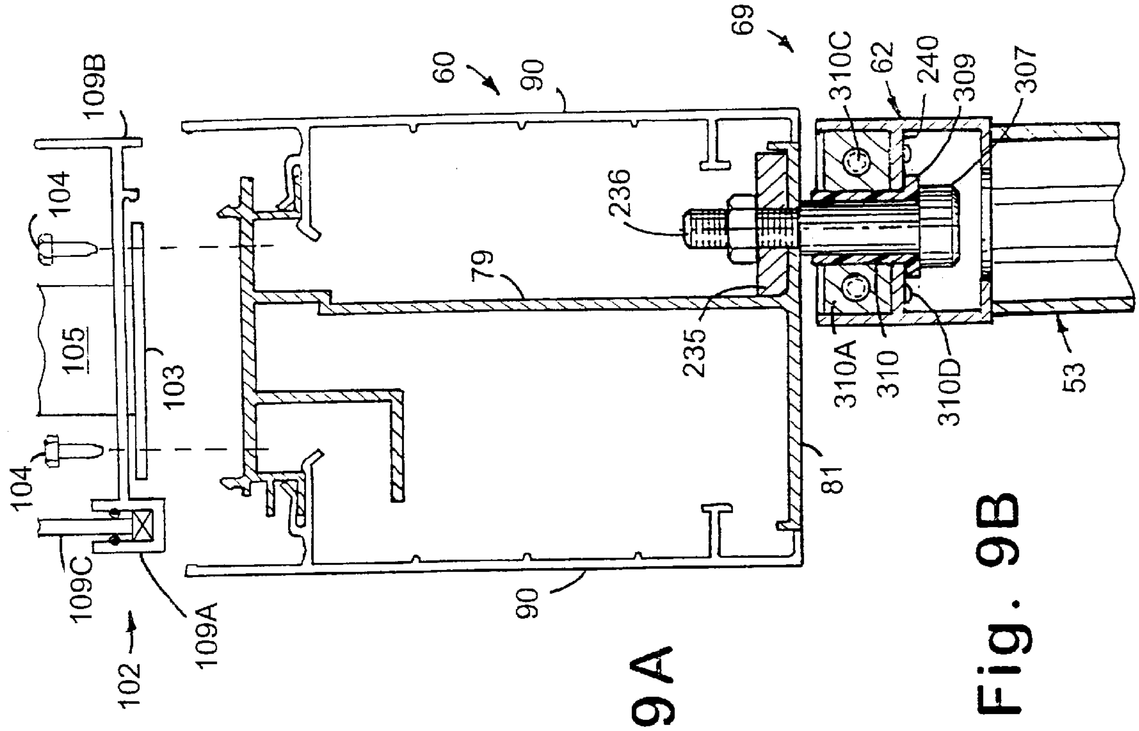
Fig. 9B
Fig. 9A
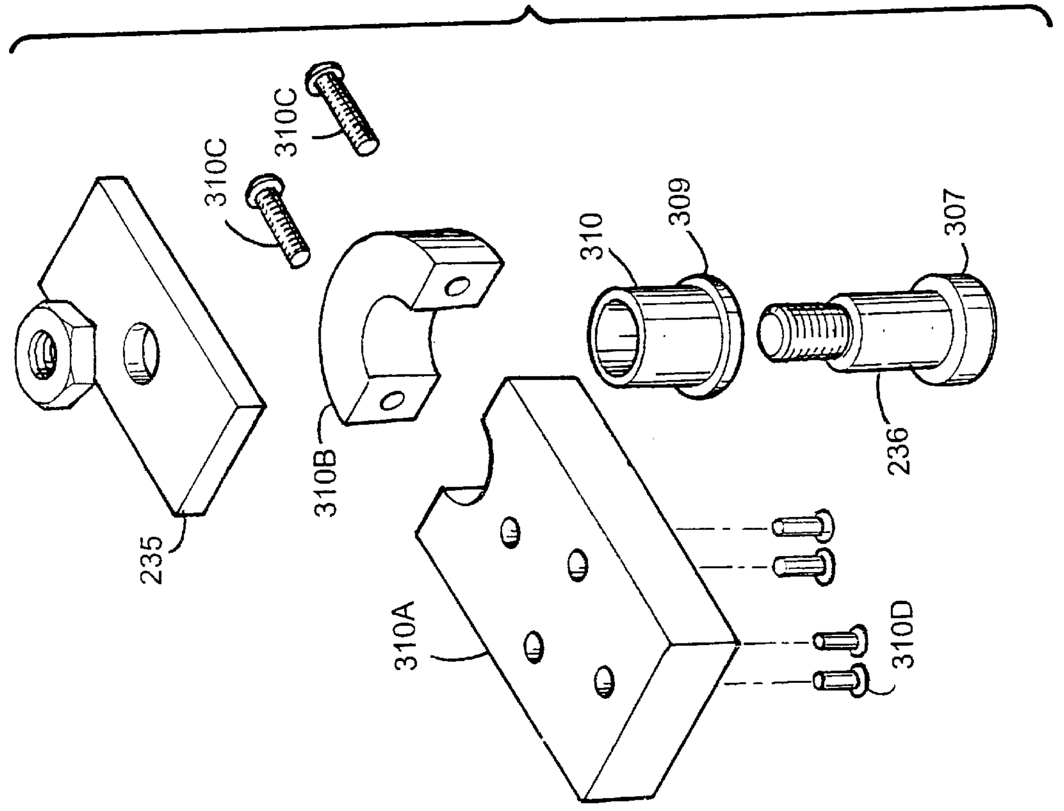

19/20

ADJUSTABLE DOOR AND DOORWAY CONSTRUCTION

BACKGROUND OF THE INVENTION

The present invention concerns an adjustable door and doorway construction where the door is configured to adjustably fit a doorway opening, and further where the doorway construction is also adjustable to better mate with adjacent wall structures, and still further where the door and doorway construction are flexibly constructed for use in either pivoting or sliding door arrangements.

It is often desirable to include doors in offices, because doors greatly increase the privacy of an office by creating physical separation from areas outside of the office. Doors also block sound transmission, thus making office conversations more private. However, building floors are sometimes uneven, causing alignment difficulties when installing walls having doors. This problem is particularly evident around doors, because not only are the uneven variations in the floor highlighted by gaps and clearances around the door, but also the unevenness of the floor can affect operation of the door. Unevenness in building floors is further problematic upon rearrangement of walls in an office area, since doors matched to fit a particular size in one area will not fit in another area. Thus the presence of doors tends to cut directly against making a wall system that is intended to facilitate rearrangement and reconfiguration. Another problem is that doors can become obstacles or hazards affecting the movement of people, such as when the doors are made to pivotally open into a small office, or where the doors are made to pivotally open into a hallway. This problem often shows up when walls and/or partition panels are rearranged, since doors may pivotally open the "wrong way". Still another problem relates to the fact that partition panels and/or movable wall systems are sometimes not strong enough by themselves to support pivoting doors, since a pivoting door can generate significant torsional loads when opened to an outermost position. As a result, where they are offered, doors for partition panel and movable wall systems often become complicated, expensive, and high warranty items. This is unfortunate, because businesses are often unwilling to purchase expensive products such as doors, particularly when the expense of the door is dramatically higher than the cost of the partition panels and/or wall units that the door goes with.

Sliding doors are an attractive alternative since sliding doors do not swing away from the wall when opened, but instead remain close to the door-supporting structure. However, many cities and customers require that sliding doors have a breakaway device that allows the sliding door to be pivotally opened quickly in an emergency simply by pressing bard against the sliding door. This is problematic in partition panel and movable wall systems, since breakaway devices are expensive to manufacture and install. Most companies desiring partition panels and movable wall systems are not interested in paying for an expensive sliding door. Another problem is that partition panels and movable wall systems are sometimes not strong enough to support pivoting doors, since the door can generate significant torsional loads when pivoted to an outermost position. Still another problem in existing known doors is that after the breakaway doors are "broken away," they must be reset by maintenance or skilled tradesman. This is undesirable since it wastes time, increases maintenance expense, and renders such doors useless until they are repaired by maintenance.

Floor sills are sometimes used to provide additional structural support around a doorway, particularly across the bottom of a doorway opening. However, sills can be trip hazards if they extend above a floor, which they must if they are to be used with partition panels and movable wall systems where it is undesirable to bury sills permanently into a floor. Also, sills collect dust and debris such that they can look unsightly. Another very real concern in the highly competitive furniture industry is cost, which requires that parts and mechanisms be as simple and low cost as possible, and that common parts be used whenever possible to minimize the total number of parts required. Sills add to installation and rearrangement costs, and add to the number of parts and pieces that need to be carried to a job site.

Accordingly, an apparatus solving the aforementioned problems and having the above-identified advantages is desired.

SUMMARY OF INVENTION

In one aspect of the present invention, a door construction for positioning in a doorway opening includes upper and lower door sections, one of the upper and lower door sections including a recess and the other of the upper and lower door sections being telescopingly mounted in the recess. The door construction also includes an adjustment mechanism operably interconnecting the upper and lower door sections for adjusting a total height of the door, whereby the upper and lower door sections can be adjusted to provide clearance around the door construction when positioned in the doorway opening.

In another aspect of the present invention, a doorway construction for use in a building space includes a doorway-defining structure defining three sides of a doorway opening and having levelers for adjusting a height of the doorway-defining structure. The doorway construction also includes a door movably supported on the doorway-supporting structure for closing the doorway opening, the door including a door extender adjustably attached to the door that is adjustable to adjust a size of the door in accordance with a size change related to adjustment of the levelers on the doorway-defining structure.

In another aspect of the present invention, a doorway construction for use in a building space includes a doorway-defining partition structure defining a doorway opening and a door support track located generally over the doorway opening. The doorway construction also includes a door including a door support mechanism slidingly engaging the track for sliding movement between a closed position where the door covers the doorway opening and a first open position where the doorway opening is uncovered. The door support mechanism includes a manually resettable breakaway latch permitting the door to move to a second open position different from the first open position when a person presses against the door with a predetermined minimum force.

In yet another aspect of the present invention, a doorway construction for use in a building space includes a doorway-defining partition structure defining a doorway opening and a door support track located generally over the doorway opening. The doorway construction also includes a door including a door support mechanism engaging the track for sliding movement between a closed position where the door covers the doorway opening and a first open position where the doorway opening is uncovered. The door support mechanism further pivotally supports the door for movement to a second open position different from the first open position where the doorway opening is also uncovered.

In another aspect of the present invention, a doorway construction for subdividing a building space includes a doorway-defining structure defining a doorway opening, a door dimensioned to fit mateably within the doorway opening, and door supporting top and bottom pivots attached to the doorway-defining structure at a top of the door opening. The door support pivot being constructed to bear a majority of the weight of the door and the bottom pivot being constructed to locate an axis of rotation of the door but not to bear weight.

In another aspect of the present invention, a door construction includes a solid panel having a vertical side edge, and an elongated structural side frame having top and bottom end sections and a mounting face. The mounting face is fixedly secured to the vertical side edge of the solid panel. The top and bottom end sections include top and bottom hinge mounts for pivotally mounting the door construction in a doorway opening.

In another aspect of the present invention, a doorway construction for subdividing a building space includes a doorway-defining structure defining a doorway opening, and a downrigger operably slidably attached to and supported by the doorway-defining structure at a top of the doorway opening. The downrigger defines a top pivot and a bottom pivot. The doorway construction also includes a door attached to the top and bottom pivots.

In still another aspect of the present invention, a kit includes a door having top and bottom pivot-receiving structures, a first doorway-defining structure including top and bottom fixed pivots constructed to pivotally engage the top and bottom pivot-receiving structures, and a second doorway-defining structure including an overhead track. A boom is configured for sliding attachment to the overhead track, the boom being constructed for selective attachment to the door to support the door, whereby the door can be selectively assembled for pivotal or sliding movement.

These and other features, advantages, and objects of the present invention will be further understood and appreciated by those skilled in the art by reference to the following specification, claims and appended drawings.

DESCRIPTION OF THE DRAWINGS

FIG. 9A is an exploded view of the top door pivot construction shown in FIG. 9;

FIG. 9B is a cross-sectional view of the top door pivot taken along the lines IXB—IXB in FIG. 9;

DETAILED DESCRIPTION OF PREFERRED EMBODIMENTS

Figure 1:
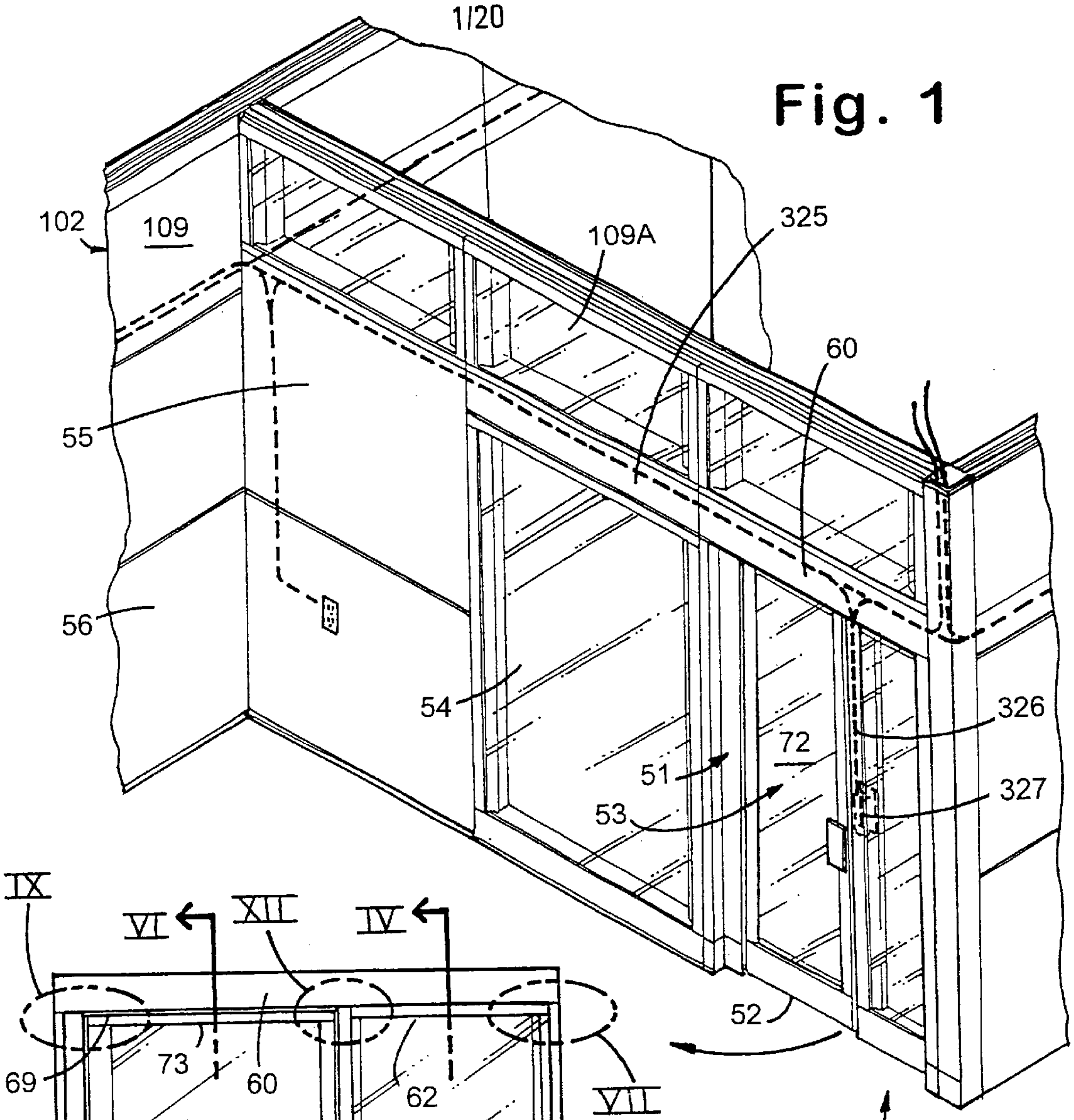
FIG. 1 is a perspective view of an office area including a doorway construction embodying the present invention, including a pivoting door.

A door and doorway construction 50 (FIG. 1) embodying the present invention includes a doorway-defining structure 51 defining a doorway opening 52, and a vertically adjustable door 53 pivoted to the structure 51 and constructed to fit mateably into the doorway opening 52. The doorway structure 51 includes an overhead expressway construction 60 configured to structurally support a weight of the door 53 and further that is adapted to carry utilities over the doorway opening 52. The doorway structure 51 is vertically adjustable to align the expressway construction 53 with adjacent wall units, including a glass-supporting partition panel 54, a sound-absorbing partition panel 55 having sound absorbing material therein, and an internally-open freestanding partition panel 56 adapted to carry a high density of utilities and to flexibly rout wiring. Vertical adjustment of the doorway-defining structure 51 results in vertical size changes in the doorway opening 52. However, the door 53 is adjustable to fill the doorway opening 52 to accommodate the size changes. Further, since the door 53 is supported from a top edge/corner, the door 53 naturally follows the doorway structure during vertical adjustment, thus greatly simplifying adjustment of the door 53 itself. It is noted that the door 53 can also be slidably mounted to a modified doorway structure having a door-supporting boom, as also described below.

Doorway Construction for Pivotally Supporting Door

Figure 2:
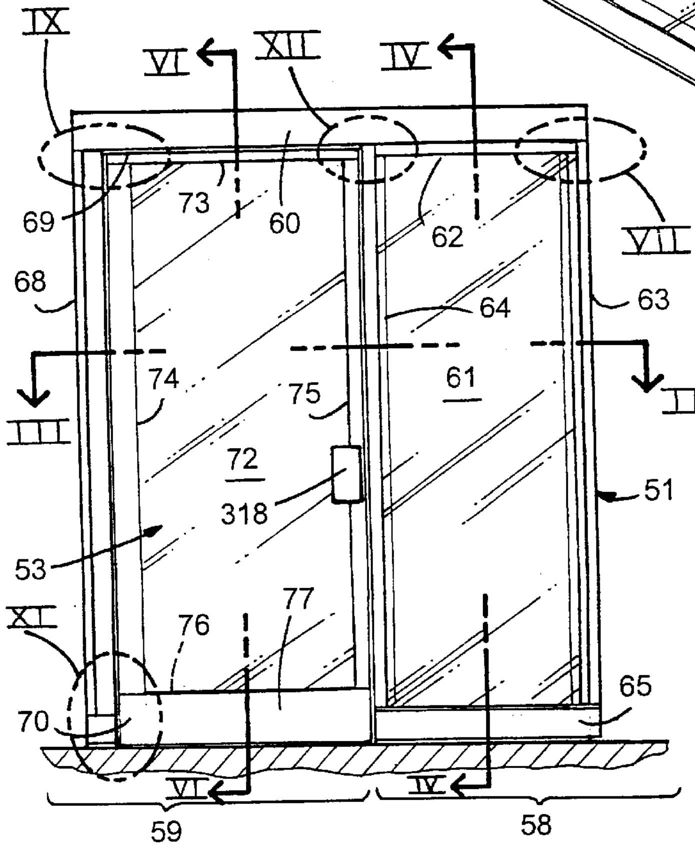
FIG. 2 is a front view of the door and doorway construction shown in FIG. 1.

Doorway defining structure or door construction 51 (FIG. 2) includes a fixed side portion 58 and a doorway-opening-defining portion 59, over both of which extends a structural expressway construction or beam 60. The fixed side portion 58, sometimes referred to herein as the "sidelite" portion, includes a window pane 61 of glass or other sheeting framed by a sidelite head 62, a sidelite fixed/outer jamb 63, a locking jamb 64, and a sidelite base 65. The base 65 is adjustably supported by a leveler 66 (FIG. 4) on a floor track or floor channel 67. The doorway defining portion 59 includes a hinge jamb 68 that supports the top and bottom door hinges 69 and 70.

Expressway beam 60 (FIG. 4) includes an I-beam like extrusion having a vertical center web 79 and top and bottom transverse webs 80 and 81. The center web 79 is offset rearwardly a small amount on the top and bottom transverse webs 80 and 81. The bottom web 81 is bolted to the sidelite head 62 with screws 82, and is bolted to the sidelite fixed outer jamb 63, the sidelite locking jamb 64, and the door jamb 68 by screws 83 and (for outer jamb 63 and door jamb 68) by screws 84. A utility support bracket 85 can be mounted to a rear side of the vertical web 79, and is located by a ridge 86 on vertical web 79. A major L-shaped web 87 extends downwardly and forwardly from a front portion of top web 80. The L-shaped web 87 adds rigidity to the expressway beam 60, and further is useful when the expressway beam is used in combination with the sliding door, as described below. A pair of smaller L-shaped attachment flanges 88 and 89 extend downwardly and outwardly in opposite directions from opposing ends of the top web 80. An expressway side cover 90 includes a flat panel 91 with a top connector 92 shaped to frictionally engage the horizontal leg of the L-shaped attachment flanges 88 (or 89). The bottom edge 93 of the cover 90 abuts an outer end of the bottom transverse web 81, and top connector 92 biases the edge 93 against the outer end of web 81. The bottom edge 93 and a second flange 93A stiffen the cover 90. The top edge 94 of the cover 90 extends upwardly and abuts an outer edge of a top cover 95, when the top cover 95 is used to cover beam 60. The top cover 95 includes a flat panel 96, and further includes down flanges 97 and 98 shaped to frictionally releasably engage up flanges 99 and 100 extending from the top transverse web 80.

Expressway beam 60 is also useable with an overhead system 102 (FIG. 6) that extends from the expressway beam 60 to a building ceiling. As shown in FIG. 1, the overhead system 102 can include decorative transom covers 109 or window subassemblies 109A. The overhead system 102 includes a transom frame having a flat bottom attachment flange 103 bolted to a top of the transverse web 80 by screws 104, and an upwardly extending tubular frame member 105. A U-shaped channel 106 is attached atop the expressway beam 60, and includes down flanges 107 and 108 that frictionally engage the up flanges 99 and 100. Transom covers 109 include bottom hook connectors 110 for engaging the up flanges on the U-shaped channel 106, and further include top connectors (not shown) for holding the transom connectors in place. The window subassemblies 109A (FIG. 9B) also include a bottom frame section 109B constructed to securely engage a top of the expressway beam 60, in a manner not unlike the U-shaped channel 106. A glass pane 109C sets in a channel defined by the bottom frame section 109B, and extends upwardly.

The sidelite head 62 (FIG. 4) includes front, top, rear, and bottom wall sections 112–115 forming a box-shaped section. Inner walls 116 and 117 extend inwardly from front and bottom walls 112 and 115 respectively, and form a downwardly facing recess 118 for receiving a top edge of the window glass pane 61. Opposing channels are formed in the recess 118 on front wall 112 and inner wall 117 to support glass wipers 119 and 120 that engage and support the edge of the glass pane 61 in the recess 118.

The sidelite fixed/outer jamb 63 (FIG. 3) is located at the vertical side edge of the doorway structure 51 that is remote from door 53. The sidelite fixed/outer jamb 63 includes a structural extrusion having a T-shaped section 122 and a tubular section 123 forming a part of a window frame around the glass pane 61. The tubular section 123 (FIG. 8) includes rear, inboard, front, and outer transverse wall sections 124–127. The front wall section 126 includes an outward ridge 128. A forward portion of outer transverse wall section 127 forms a recess 130 with ridge 128, and includes a detent 131 located midway in the recess 130. A glass captor 132 includes an attachment leg that extends into recess 130, and a glass-engaging leg 134 that opposes outward ridge 128 when glass captor 132 is installed. The attachment leg includes an elbow 135 for frictionally engaging the detent 131, and an arm 136 that engages a side of the outward ridge 128 to bias the glass-engaging leg 134 torsionally toward outward ridge 128. The outward ridge 128 and glass-engaging leg 134 each include channels for retaining glass wipers 137 and 138. A portion of the front wall section 126 is angled. The angled front wall section 126 adds strength to the cross section. The front wall section 126 positions the glass pane 61 in a forward position that is substantially flush with a front of the sidelite fixed/outer jamb 63. The flush glass and the angled front wall provide a particularly distinctive appearance to the doorway structure 51, particularly when positioned adjacent the door 53 that has a centered glass a pane.

The T-shaped section 122 (FIG. 8) includes a rear leg 140 that aligns with rear wall section 124, and an outboard transverse wall section 141. The first transverse wall section

127 includes an L flange 142 having a first detent 143, and rear leg 140 includes a second detent 144. A leveler 145 (FIG. 3) includes a frame-attached part 146 having an attachment flange that fits against the first transverse wall section 127 and is captured there by the detents 143 and 144. An attachment screw 148 extends through the first transverse wall section 127 and threadably into attachment flange 147. The threaded leveler screw 148 threadably engages a threaded nut 149 on the frame-attached part 146, and includes a hex head 150 (FIG. 4) that can be turned by a wrench to adjust the height of the outer jamb 63.

The transverse wall section 141 (FIG. 8) includes a planar wall section 151, screw-receiving boss flanges 152 and 153, J-shaped stiffening ribs 154 and 155, and I-shaped stiffening ribs 156 and 157. The outboard ends of the ribs 154–157 align and define a planar face at the vertical side edge of the doorway defining structure 51. An end cover 158 (FIG. 10) is attachable along the planar face. The end cover 158 includes a planar panel 159, and a pair of attachment "Christmas tree" connectors 160 and 161 adapted to frictionally engage the ends of the J-shaped stiffening ribs 154 and 155. At predetermined heights, holes are drilled through the J-shaped stiffening ribs 154 and 155 and into the outboard transverse wall section 141. When a partition panel (e.g. partition panels 54–56) is attached to the vertical side edge, cover 158 is removed and bolts 162 and 163 (FIG. 8) are extended through the holes in the transverse wall section 141 from the inside thereof, and through mating holes in the adjacent partition panel and threadably into a nut or other mating threaded part. Advantageously, outer jamb 63 is constructed so that the bolts 162 and 163 can be positioned in the holes in the transverse wall section 141 by simply removing covers on the jamb 63 without otherwise tearing apart the outer jamb 63.

An L-shaped front cover 164 (FIG. 10) covers the inside and front of the transverse wall section 141 to provide a visually acceptable appearance. The L-shaped front cover 164 includes a front main panel section 165 and a transverse main panel section 166. A front flange 167 extends outwardly from the end of the transverse main panel section 166, and includes a resilient connector 168 that frictionally engages a front end of the transverse wall section 141. Another connector 169 is located on the opposite end of front cover 164. The second connector 169 includes a stem and an enlarged head 170. A resilient rubber gasket 171 is positioned in a pocket defined by the L-shaped flange 142 on the transverse wall section 141, and is configured to frictionally receive and retain the second connector 169 from a frontal direction. When attached, the front main panel section 165 (FIG. 8) aligns with the front leg glass-engaging leg 134 of the glass captor 132.

Figures 4, 5:
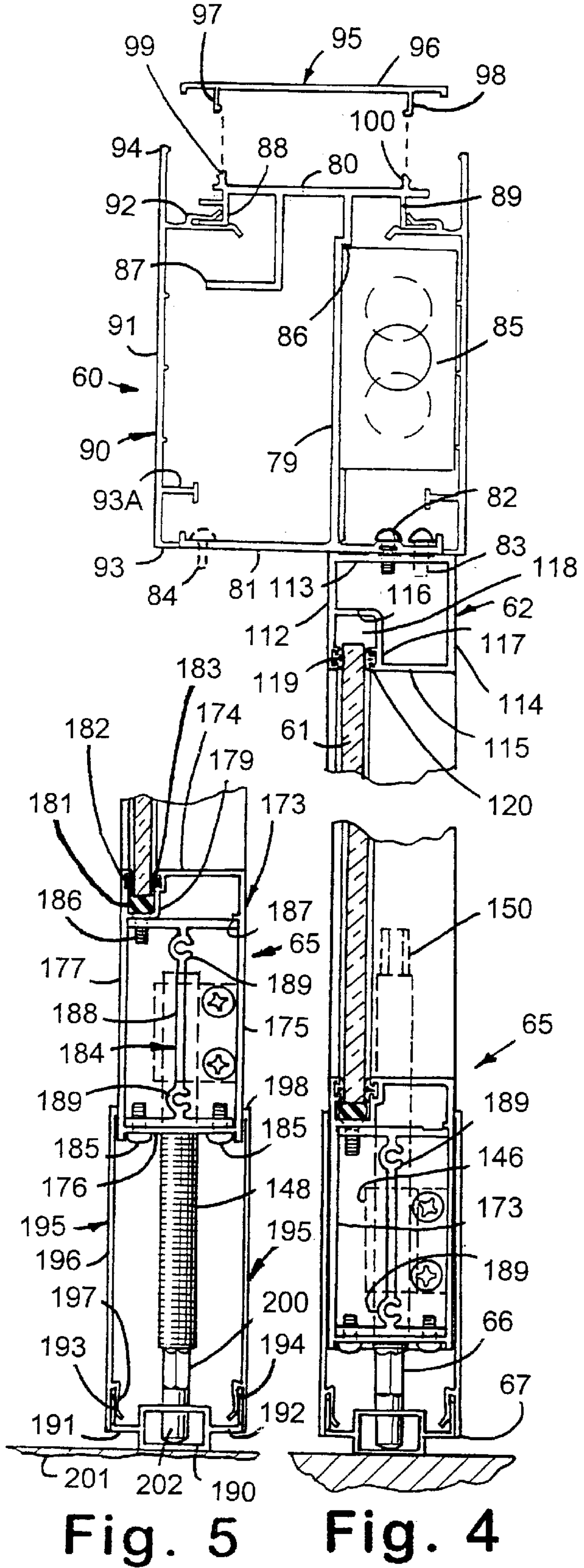
FIG. 5 is a fragmentary view of a bottom portion of the doorway construction shown in FIG. 4, but with the doorway construction extended to provide a greater total height.

The sidelite base 65 (FIG. 5) includes a box-shaped extrusion 173 having top, rear, bottom, and front side wall sections 174–177. A recess is formed at a front of the top wall section 174 by a vertical wall section 179 and a horizontal wall section. A glass-edge support block 181 is positioned in the recess for supporting an edge of the glass pane 61, and glass wipers 182 and 183 are located in opposing channels for engaging the glass pane 61 to center the glass pane 61 on the support block 181. An I-beam 184 is positioned inside of the box-shaped extrusion 173 to provide additional structural strength to the box-shaped extrusion 173. The I-beam 184 is held in place by top and bottom screws 185 and 186 that extend through top and bottom wall sections 174 and 176, and by a tab 187 on the rear wall section 175. The vertical center web 188 of the I-beam 184 includes a pair of screw-receiving bosses 189 that provide screw attachment of the sidelite base 65 to the sidelite outer jamb 63 and to the sidelite locking jamb 64. The frame attached part 146 of leveler 145 is shown in FIG. 4 as being attached only to the sidelite outer jamb 63, but it is noted that the frame attached part 146 can be extended and attached to the vertical center web 188 if additional stability is desired.

The floor track 67 (FIG. 5) includes a tubular center section 190 and opposing L flanges 191 and 192 each having an up leg 193 and 194. A base-to-floor cover 195 includes a flat panel 196 with a bottom spring clip 197 configured to frictionally/vertically engage the up leg 193 (or 194), and a top lip 198 that is biased against the outer surface of the box-shaped base extrusion 173 by the bottom clip 197. A lower end section of the leveler screw 148 includes a hex-shaped section 200 that allows engagement by a wrench for turning the leveler screw 148 adjacent the floor 201 when the base-to-floor cover 195 is removed, and further includes a tip 202 that rotatably extends through a hole in the top of the tubular center section 190 and abuts a bottom of the tubular center section 190.

When leveler screw 145 is rotated, it jacks the leveler nut 149 upwardly (FIG. 5) or downwardly (FIG. 4), which takes the sidelite base 65 with it. Naturally, the entire doorway defining structure 51 moves with the adjustment. Specifically, as the base 65 is adjusted upwardly (or downwardly), the box-shaped extrusion 173 moves vertically. The front and rear base-to-floor covers 195 remain attached to the floor track 67, and their top lips 198 slidingly engage the box-shaped extrusion 173 to thus form a visually acceptable appearance, despite the adjustment of the base 65.

The sidelite locking jamb 64 (FIG. 3) includes a glass-supporting tubular section 204 and a remaining rectangular tubular section 206. The locking jamb 64 is similar to the outer jamb 63 in that its glass-supporting tubular section 204 is a mirror image of the glass-supporting tubular section 123 of the outer jamb 63. A transverse wall section 205 of the tubular section 204 is basically the same as the transverse wall section 127 of tubular section 123, and a leveler 145 is attached to the transverse wall section 205 similar to the way that one of the levelers 145 is attached to the transverse wall section 205. A glass captor 132 identical to the glass captor 132 (but inverted) engages the tubular section 204 to retain the glass pane 61 against tubular section 204 in a forward position approximately flush with a front of the locking jamb 64. The remaining section 206 of locking jamb 64 includes rear, inboard/transverse and front wall sections 207–209 that form a rectangular tube with transverse wall section 205 of the tubular section 204. The inboard wall section 208 forms an inner surface that faces the door 53. The wall sections 205 and 207–209 define a recess 210 that can be used as a wireway (see FIG. 1).

The sidelite door jamb 68 (FIG. 3) includes an outer section 211 and an inboard tubular section 212. The inboard tubular section 212 is box-shaped with an outer cross section identical to the rectangular tubular section 206 on locking jamb 64. The inboard wall section 213 of the inboard tubular section 212 defines a portion of the door opening 52 that is opposite the wall section 208 on the locking jamb 64. The outer section 211 includes a T-shaped section 214, an end cover 215, and front cover 216 that are mirror images of the related parts 122, 158, and 164 on outer jamb 63. Thus, a detailed description of these parts is not deemed necessary, since it would be largely redundant. Notably, the covers 158 and 215 can be inverted such that they are interchangeable, and also the covers 164 and 216 can also be inverted and interchanged.

Figure 7:
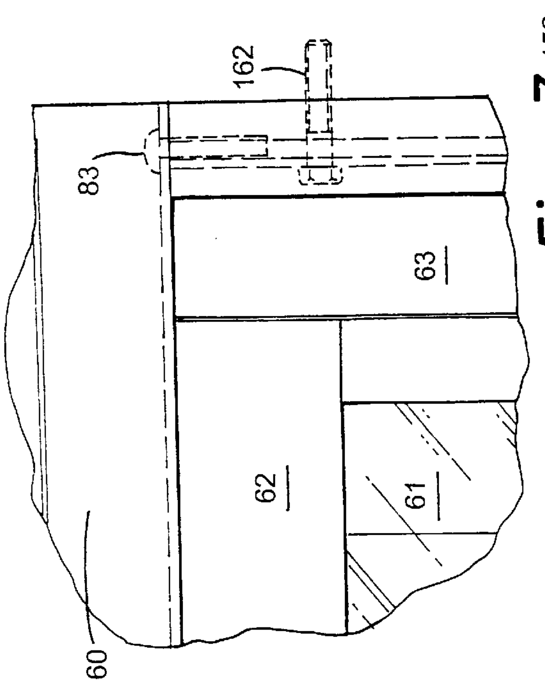
FIG. 7 is an enlarged view of the circled area VII in FIG. 2.
Figure 8:
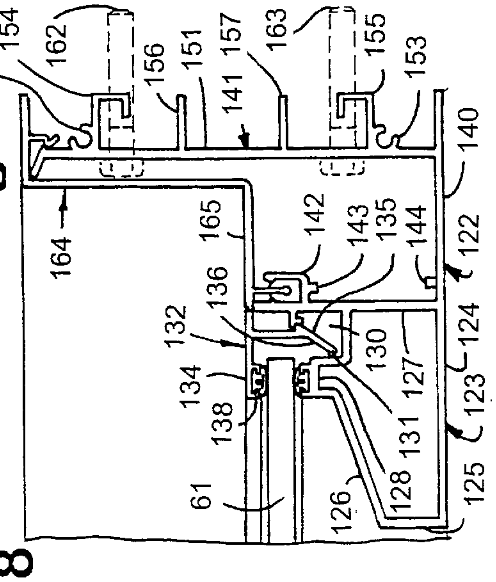
FIG. 8 is a bottom view of the doorway construction shown in FIG. 7, looking upward.
Figure 9:
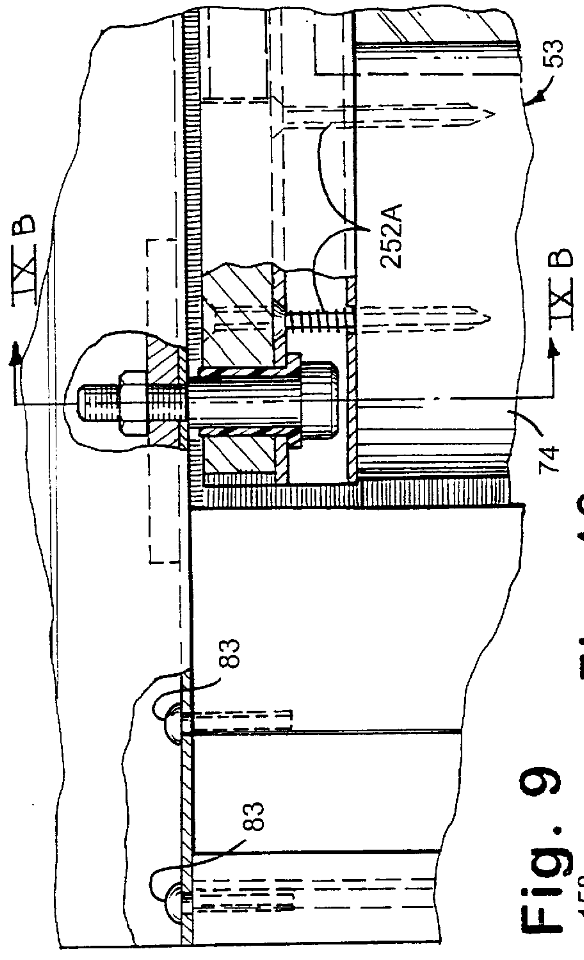
FIG. 9 is an enlarged view of the circled area IX in FIG. 2, showing the top door pivot.
Figure 10:
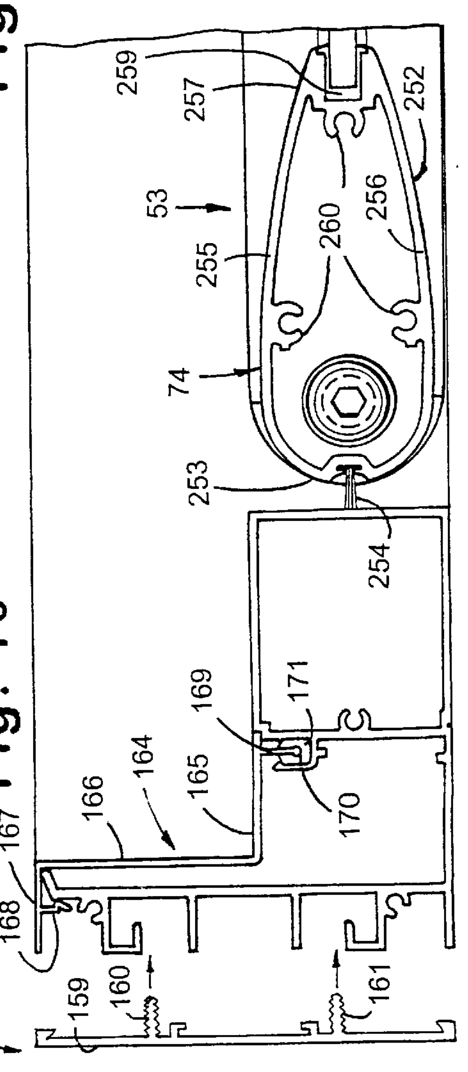
FIG. 10 is a bottom view of the top pivot construction shown in FIG. 9.
Figure 13:
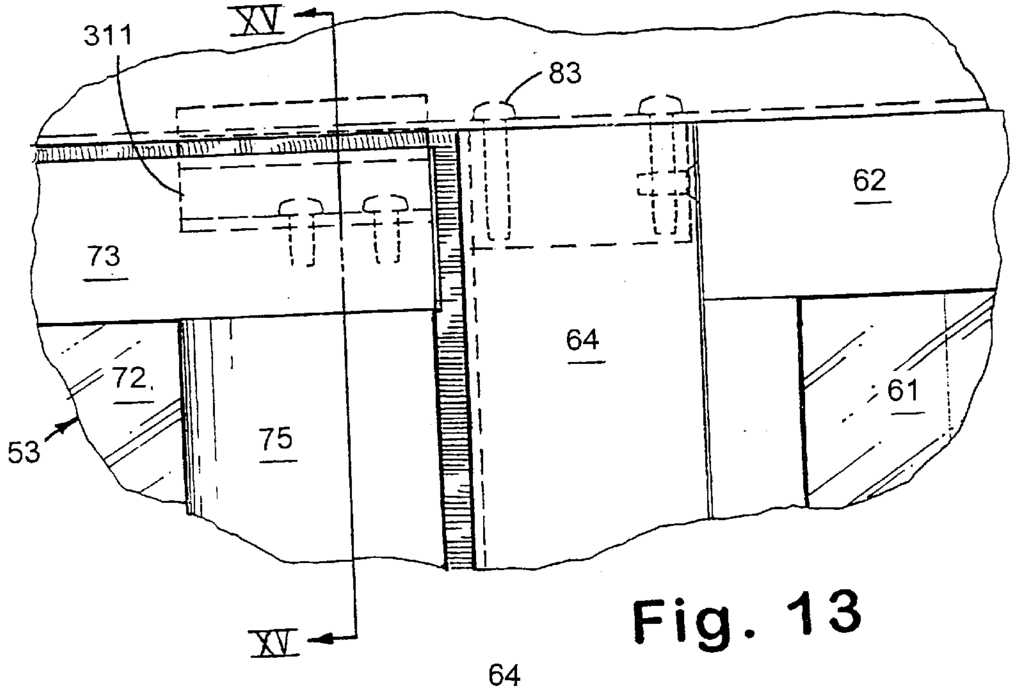
FIG. 13 is an enlarged view of the circled area XIII in FIG. 2.
Figure 14:
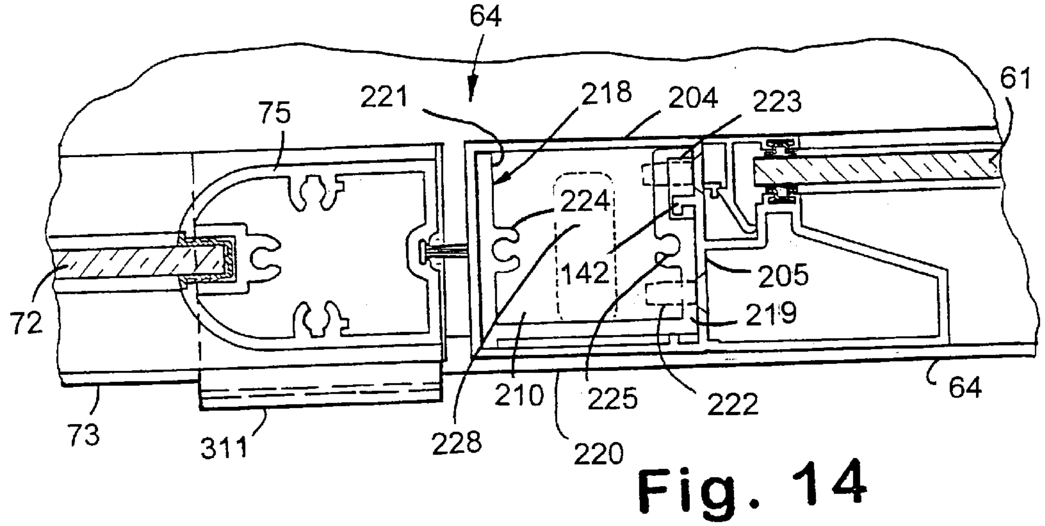
FIG. 14 is a bottom view of FIG. 13.

The sidelite jambs 63, 64 and 68 are attached to the sidelite head 62 by screws such as exemplary screws 83 (FIG. 4) that extend vertically downwardly through the transverse web 81 of expressway beam 60 into the boss flanges of sidelite outer jamb 63 (see FIGS. 7 and 8); sidelite locking jamb (FIGS. 13 and 14); and sidelite door jamb 68 (FIGS. 9 and 10). The rectangular tubular section 206 of sidelite locking jamb 64 is reinforced with a reinforcement extrusion 218 (FIG. 14) that anchors it to the expressway beam 60. The reinforcement extrusion 218 telescopes a short distance downwardly into the recess 210 of tubular section 204 defined in the jamb 64. The reinforcement extrusion 218 is U-shaped, and includes side walls 219–221 that lie adjacent the wall sections 205, 207 and 208. A screw 222 extends through the transverse wall section 205 into the side wall 219 of the reinforcement extrusion 218. Notably, a portion of the tubular sections 123 and 204 are cut off at the top to receive an end of the sidelite head 62, the making a corner that is easier to accurately form and control in manufacturing. Since the tubular section 204 is cutoff, the screw 222 can be easily positioned and driven through the wall section 205 into the side wall 219. The side wall 219 includes a recess 223 shaped to mateably receive the L flange 142 on the side wall section 205. Bosses 224 and 225 are formed on the wall sections 219 and 221, for receiving screws. It is contemplated that a reinforcement similar to reinforcement extrusion 218 can also be positioned at the height of a door lock to reinforce the locking jamb 64. FIG. 14 illustrates that an aperture 228 can be formed in the portion of sidelite head 62 and expressway beam 60 corresponding to the top or the bottom of the jambs 63, 64 or 68 for permitting vertical routing of wiring into the doorway structure 51 from the expressway beam 60.

The sidelite outer and locking jambs 63 and 64 are attached to the sidelite base 65 by horizontally extending screws that extend through the transverse flanges 127 and 205 of jamb 63 and 64 (FIG. 3) into the bosses 189 on vertical center web 188 of the I-beam 184 of the base 65 (FIG. 4).

Figure 12:
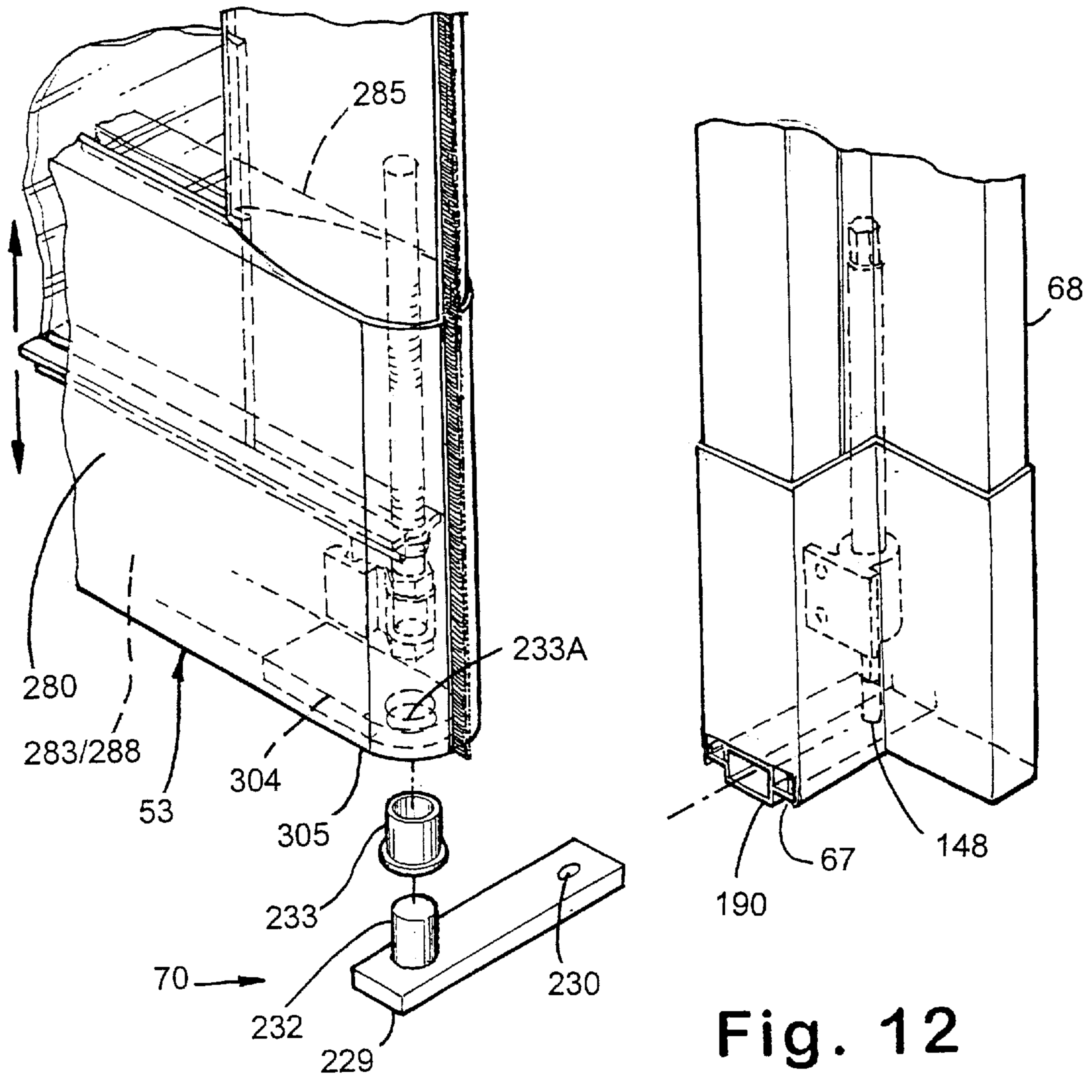
FIG. 12 is an exploded perspective view of the bottom door pivot shown in FIG. 11.

A bottom hinge 70, described in more detail below, includes a hinge plate 29 (FIG. 12) that extends into the recess in tubular center section 190 of the floor track 67. The hinge plate 229 includes a hole 230 that is engages by the tip of the leveler screw 148, which engagement secures the hinge plate 229 in position. An end 231 of the hinge plate 229 extends into the doorway opening 52, and a stud 232 extends upwardly therefrom. A bushing 233 is positioned on the stud 232. A bottom pivot assembly on the door 53 engages the bushing 233, as discussed below.

A top hinge 69, also described in more detail below is formed directly above the bottom hinge 70. The top hinge 69 (FIG. 9B) includes a pivot backer 235 positioned on the lower transverse web 81 adjacent and rearward of the vertical center web 79. A pivot bolt 236 extends through the pivot backer 235 and lower web 81. A lower portion of the pivot bolt 236 pivotally engages the door 52, and carries the weight of the door 53, such that bottom hinge 70 fixes the axis of rotation of the door 53 at the floor, but does not carry the weight of the door 53. This causes the door 53 to move vertically when the doorway-defining structure 51 is vertically adjusted. This arrangement is believed to be a significant change from prior art of doors for partitions and the like since in the partition art, doors typically are set relative to the floor, and custom aligned to the floor to accommodate variations in a floor. The present system is driven by alignment of the overhead expressway structures (and the wires carried therein), which is at the top of the door 53.

Adjustable Door Construction (With Glass)

The adjustable door 53 (FIG. 2) includes a glass pane 72, supported on its edges by a door frame that includes a top rail 73, a hinge stile 74, a locking stile 75, and a floating rail 76 adjustably supported in a bottom rail 77. The hinge stile 74 is pivoted to the top and bottom hinges 69 and 70, with the majority of the weight of the door 53 being carried by the top hinge 69, as described below.

The top rail 73 (FIG. 6) includes a U-shaped extrusion having a horizontal main wall section 240 and a pair of upwardly extending front and rear wall sections 241 and 242 that define a recess 243. A downwardly facing U-shaped top plate 244 fits mateably into the recess 243, and includes a horizontal top wall 245 and side walls that frictionally engage the insides of front and rear wall sections 241 and 242. Two U-shaped wall sections 248 and 249 combine with main wall section 240 to form spaced apart square tube sections under the main wall section 240. The wall sections 248 and 249 stiffen the main wall section 240, and further define a recess therebetween for receiving a U-shaped edge support block 251 for supporting an upper edge of the glass pane 72. The support block 251 is resilient, and includes side barbs for frictionally engaging the inside surfaces of the wall section 248 and 249 to help retain the support block 251 in place between the tube sections 248 and 249. Screws 252A (FIG. 9) extend downwardly through the main wall section 240 through tube sections 248 and 249 into the hinge stile 74 and the locking stile 75 as described below.

Figure 6:
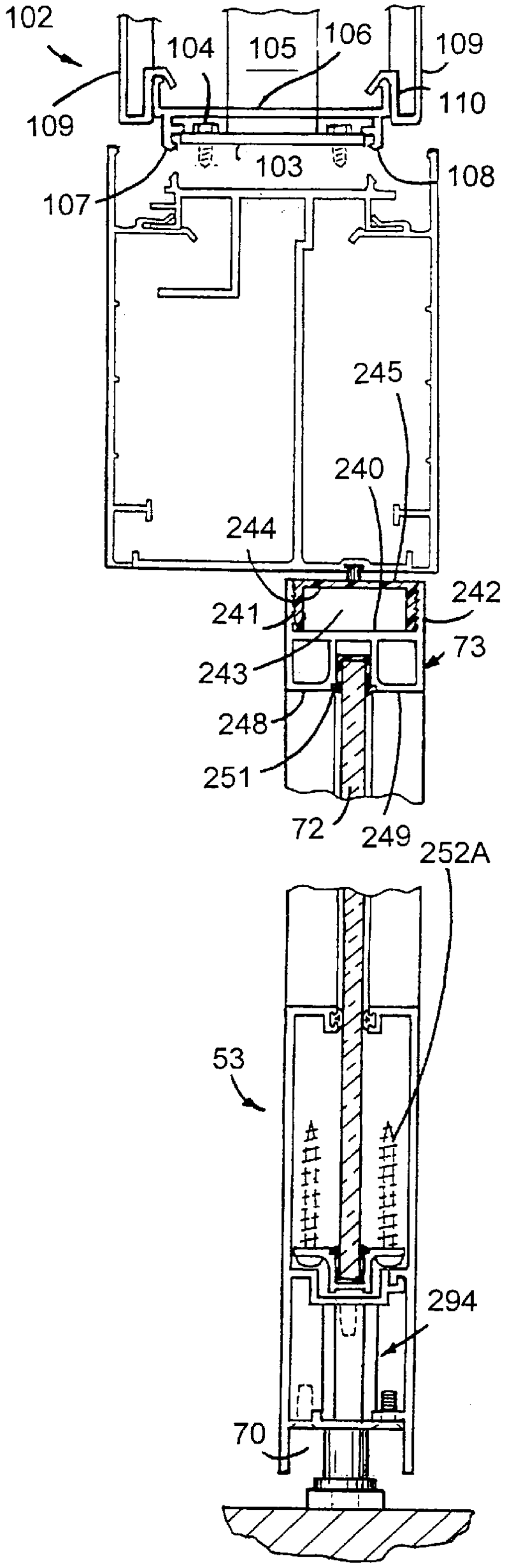
FIG. 6 is a cross-sectional view taken along the line VI—VI in FIG. 2.

The hinge stile 74 (FIG. 10) includes a torpedo-shaped extrusion 252 having an arcuately shaped, enlarged end section 253 with a brush 254 positioned in an end groove to block light that would otherwise pass between the hinge stile 74 and the door jamb 68, and further having elongated curvilinear side wall sections 255 and 256 terminating in a narrow end section 257. The narrow end 257 defines a channel for supporting a U-shaped resilient glass-edge support 259 for the door glass pane 72. The edge support 259 is identical to the glass support 251. Three bosses 260 are formed on the inside of the wall sections 255–257, for receiving the attachment screws 252A (FIGS. 6 and 9). A stiffener is positioned in the torpedo-shaped extrusion 252 if needed to stiffen the hinge stile 74.

The locking stile 75 (FIG. 3) includes a bullet-shaped extrusion 261 having an arcuately-shaped end section 262, parallel side sections 263 and 264, and a flat face section 265. The flat face section 265 includes a light brush 266 to prevent light from passing between the face section 265 and the locking jamb 64. The arcuate end section 262 includes a channel for receiving a resilient glass support 267 for supporting an edge of the glass pane 72. The glass support 267 is identical to glass support 251. Three bosses 268 are formed in the extrusion 261, for receiving the attachment screws 252 for assembly to the top rail 73 and floating rail 76.

The floating rail 76 (FIG. 6A) is an extrusion that defines a center channel 269 that receives a resilient glass support 270, and includes opposing arms 271 and 272. Screws 273 and 274 extend upwardly through the arms 271 and 272 into the bosses 260 and 268 of stiles 74 and 75.

The bottom rail 77 (FIG. 6A) is configured to slidingly, adjustably receiving the floating rail 76. Specifically, the bottom rail 77 includes first and second mating extrusions 275 and 276 screwed together with screws 277 and 278 to form a box-shaped section defining a recess 279 shaped to slidingly receive the floating rail 76. The extrusion 275 includes a vertical side wall 280 and top, intermediate, and bottom inwardly facing legs 281–283. The intermediate leg 282 dips downwardly to form a recess 284 for receiving a bottom of the center channel 269 of the floating rail 76 (see FIG. 6). The mating extrusion 276 (FIG. 6A) includes a vertical side wall 285 that extends parallel to side wall 280, and further includes inwardly extending top, intermediate, and bottom legs 286–288. The bottom legs 283 and 288 overlap, and are secured together with screws 283. The intermediate legs 282 and 287 also overlap and include hooked flanges 290 that interlockingly engage. It is noted that leg 282 is longer than leg 287, and hookingly engages and joins with leg 287 near to vertical wall 285. The top legs 281 and 286 include channels for receiving glass wipers 292 and 293, the top legs 281 and 286 holding the wipers 292 and 293 against the glass pane 72.

Figure 11:
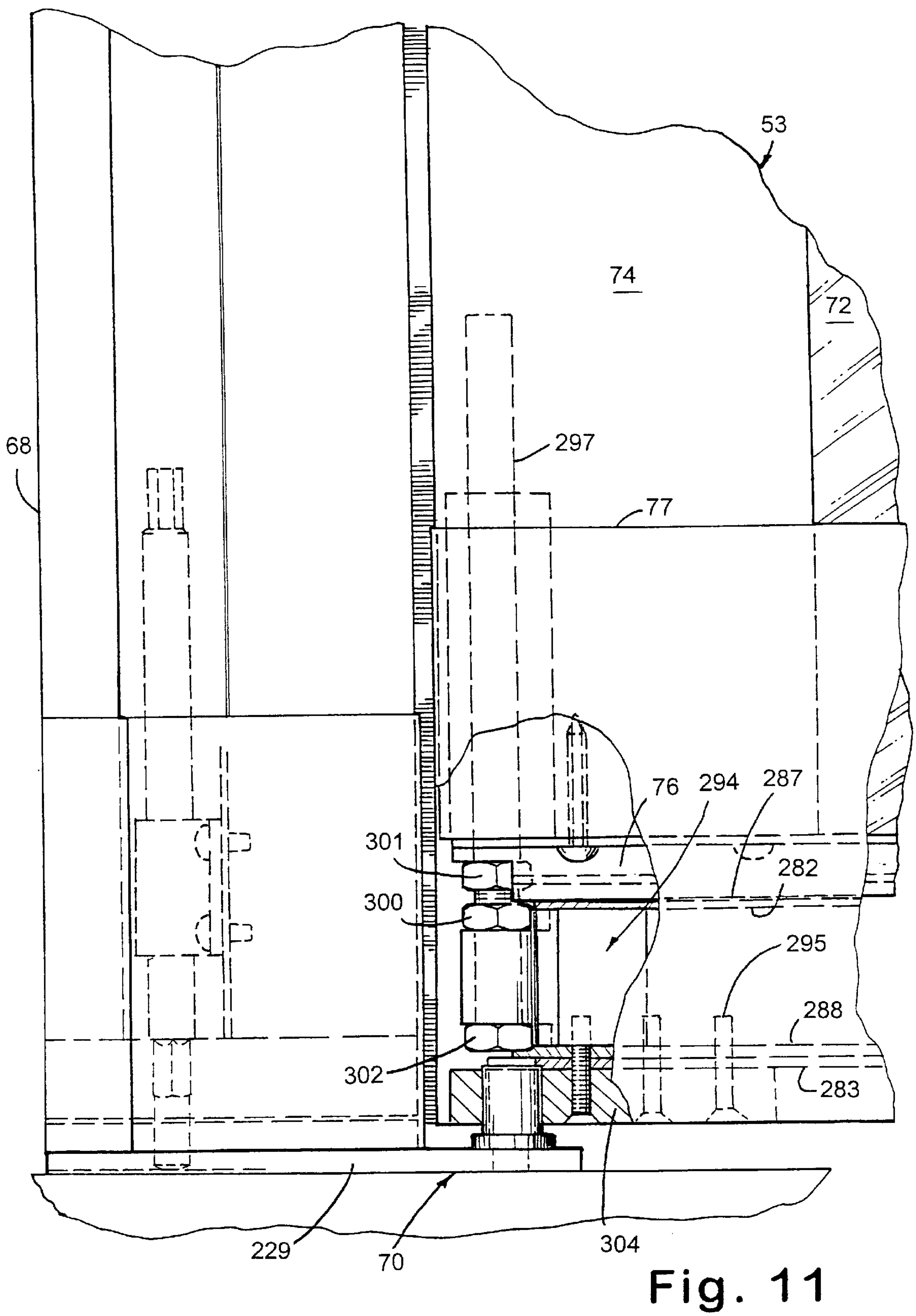
FIG. 11 is an enlarged view of the circled area XI in FIG. 2.

A height adjuster 294 (FIG. 11) is positioned between the intermediate and bottom legs 282/287 and 283/288. The height adjuster 294 is secured in place by screws 295 that extend through the legs into the stiffener 294. A threaded block 297 is welded to a bottom edge of the hinge stile 74, and an adjuster screw 298 has an end 299 that threadably rotatably engages the threaded block 297. The adjuster screw 298 extends through the intermediate legs 282 and 287 and upwardly into the threaded block 297. Nuts 300 and 301 are positioned on opposite sides of the intermediate legs 282 and 287, and a third nut 302 is located below the height adjuster 294 and above the bottom legs 283 and 288. The illustrated nuts 300–302 rotate with the screw 298, such that when the adjuster screw 298 is rotated, the threaded block 297 rides up on the screw 298. Thus, the hinge stile 74 is adjusted to an extended or retracted position. The floating rail 76 of course moves with the hinge stile 74 since it is attached to the hinge stile 74, thus causing the floating rail 76 to be adjusted to different height adjusted positions in the bottom rail 77 as the adjuster screw 298 is turned. It is contemplated that the present invention includes various structures for adjustment of a floating rail or bottom door section, such various structures including things that utilize screws with adjustable positioning nuts, cams, wedges, and/or other means for providing controlled, non-binding extension of a rectangular lower portion of a door.

The lower hinge 70 (FIG. 12) includes a bottom block 304 positioned between lower edges 305 of the side walls 280 and 285, respectively. The bottom block 304 is held in position by screws that extend upwardly into the bottom legs 283/288. The bottom block 304 includes a hole 233A for receiving the bushing 233 that rides on stud 232 of bottom hinge plate 70. Notably, the bottom plate 229 engages the bushing 232 to control the axis of rotation of the door 53, but the bottom hinge 70 is not intended to bear much of the weight of the door 53. Instead, the weight of the door 53 is carried by top hinge 69.

The weight bearing top hinge 69 (FIG. 9B) includes the pivot backer 235, which sets on the lower web 81 of the expressway beam 60, and the pivot bolt 236, which extends through the pivot back 235 and the lower web 81. The pivot bolt 236 includes a head 307 and a shaft 308, and a slip washer or bearing 309 is positioned on the pivot bolt shaft 308 adjacent the head 307. The shaft 308 extends through a hole in the main wall section 240 of top rail 73 where it engages a bushing 310 that rides within the top rail 73. Notably, washer 309 and bushing 310 can be a single integral part. It is noted that the pivot bolt 236 can be elongated to extend farther into the hinge stile 74, and that a top section of the hinge stile 74 can be stiffened and reinforced as far downwardly as necessary to provide the torsional and tensile support necessary for the door 53. In the illustrated arrangement, mating stiffeners or pillow blocks 310A and 310B are attached together and to rib 240 on opposite sides of bushing 310 by screws 310C and 310D where it is positioned in the recess 243 of top rail 73.

Figure 15:
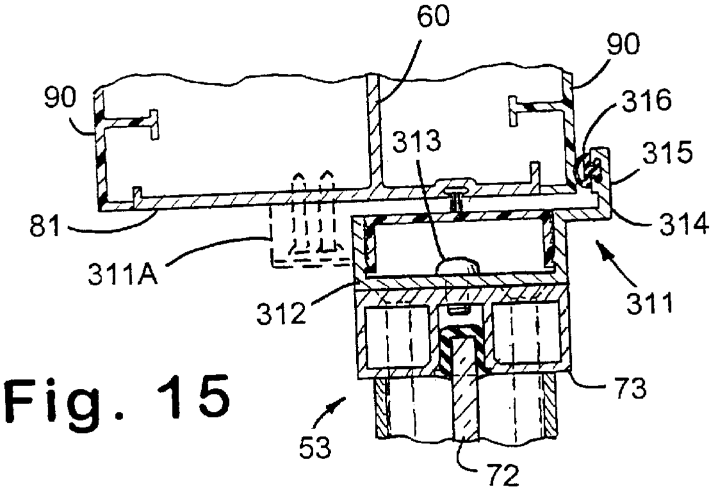
FIG. 15 is a cross-sectional view taken along XV—XV in FIG. 13.

A door stop bracket 311 (FIG. 15) is attached atop the top rail 73. The door stop bracket 311 includes a first section 312 that abuts a top of the main wall section 240 and is screwed to it by a screw 313. An arm 314 extends laterally from first section 312, and includes an up flange 315 having a bumper 316 thereon that abuts the side of the expressway beam 60 or its cover when the door 53 swings to a closed position. Alternatively, a door stop 311A (see dashed lines) can be attached to a bottom of the bottom web 81 to act as a bumper against the door 53.

Door hardware such as a door latch and handle 318 (FIG. 1) are attached to the locking style 75, the door latch being positioned to engage mating hardware on the locking jamb. Such hardware is well known in the art, and need not be described in detail herein in order to understand the present invention.

Figure 29:
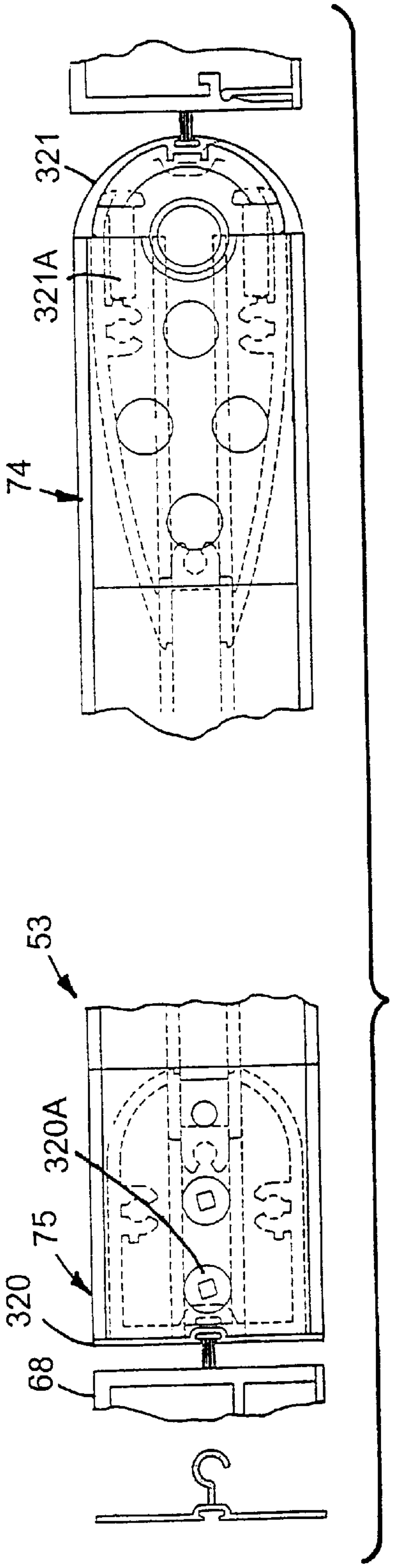
FIG. 29 is a top view of the door shown in FIG. 2 and in FIG. 16.
Figure 30:
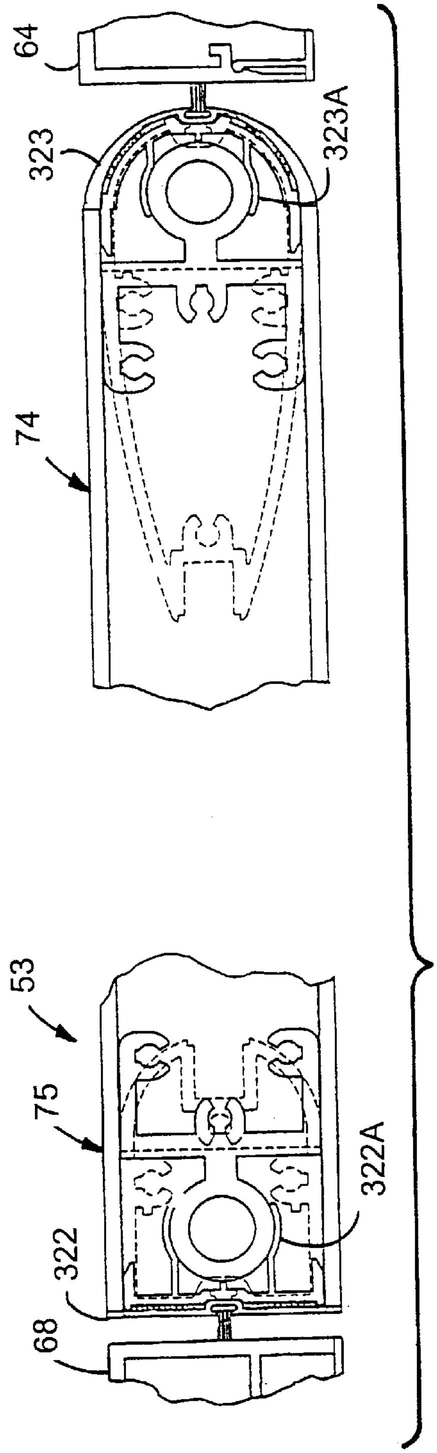
FIG. 30 is a bottom view of the door shown in FIG. 2 and in FIG. 16.

Opposing top door caps 320 and 321 (FIG. 29) are attached to the top ends of the stiles 74 and 75, and opposing bottom door caps 322 and 323 (FIG. 30) are attached at the bottoms of the stiles 74 and 75, to aesthetically cover the corners of the door 53 at its hinges (69 and 70) where the attachment screws would otherwise show. The door caps include legs attached by screws 320A and 321A, or resilient legs 322A and 323A that frictionally engage features on the door to cover outboard ends of the top and bottom rails.

It is contemplated that the present extendable door 53 is useable with a variety of different door-supporting structures, and it is specifically noted that the present extendable door is not contemplated to be limited to use only with an adjustable doorway structure such as structure 51.

Connection and Relation of Doorway Construction to Other Panels

Figures 3, 6A:
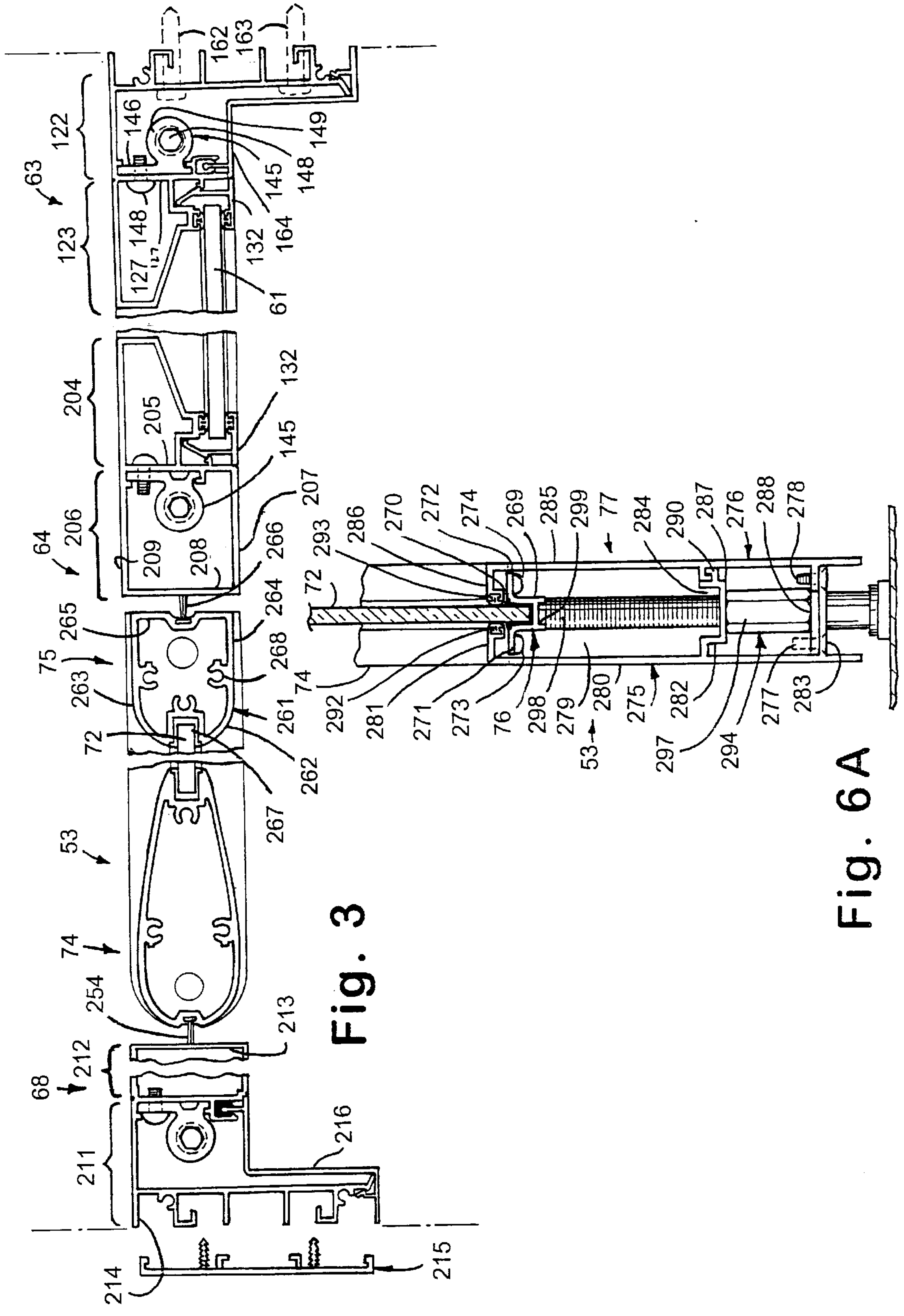
FIGS. 3 and 4 are cross-sectional views taken along lines III—III and IV—IV in FIG. 2.
FIG. 6A a fragmentary view cross-sectional view of a bottom portion of the door shown in FIG. 6, but with the door extended to provide a greater total height.

As noted above, the doorway structure 51 is interconnectable to adjacent different wall units 54–56 through use of bolts 162 and 163 (FIG. 8). Further, this can be done without disassembly of the doorway-defining structure 51, by simply removing a front cover 164 (FIG. 3). Further, it is also possible to vertically adjust the present doorway-defining structure 51 through use of levelers 145, such as to align its expressway construction 53 with expressways of adjacent wall units. Such an adjustment results in vertical size changes in the doorway opening 52, but the present door 53 is adjustable such that it can accommodate any size changes of the door opening through use of levelers/extenders 294 that adjust bottom rail 77. The above-described structure advantageously allows continuous lay-in wiring 325 into the overhead expressway area along walls including the door and doorway construction 50 (FIGS. 1). Further, the wiring can be extended downwardly into the jambs, such as by extending wires 326 into the locking jamb 64 through aperture 228 (FIG. 14) to electrify a light switch 327 (FIG. 1). Notably, where local or federal regulations require it, the jamb-extending wire 325 may be low voltage wires that control a remote relay for activating a light switch or the like.

Another advantage of the present invention is the flush-mounted sidelite glass panes 61 in combination with the center mounted door glass panes 72. This provides a very distinctive appearance, and provides a natural shadowed highlight indicating where the doors or exits are to a room. The curvilinear shapes of the glass capturing components further highlight this novel look.

Doorway Construction for Slidable Door (With Breakaway)

Figure 16:
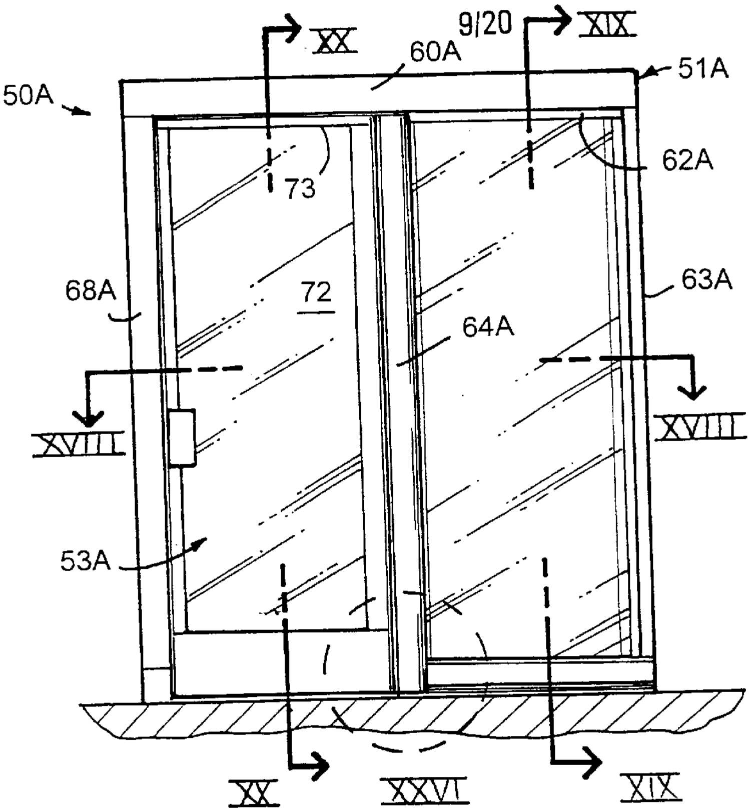
FIG. 16 is a front view of a modified door and doorway construction similar to the pivoting door shown in FIG. 2, but the modified door being slidable and including a breakaway latch.
Figure 17:
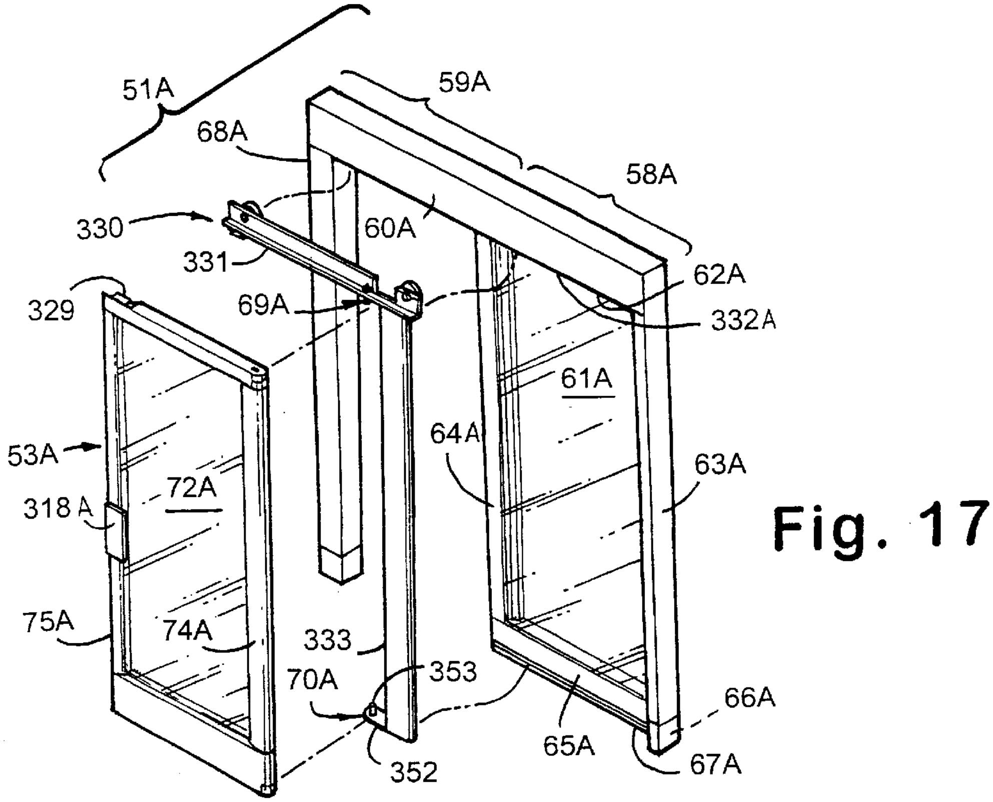
FIG. 17 is an exploded perspective view of the door and doorway construction shown in FIG. 16.
Figure 17B:
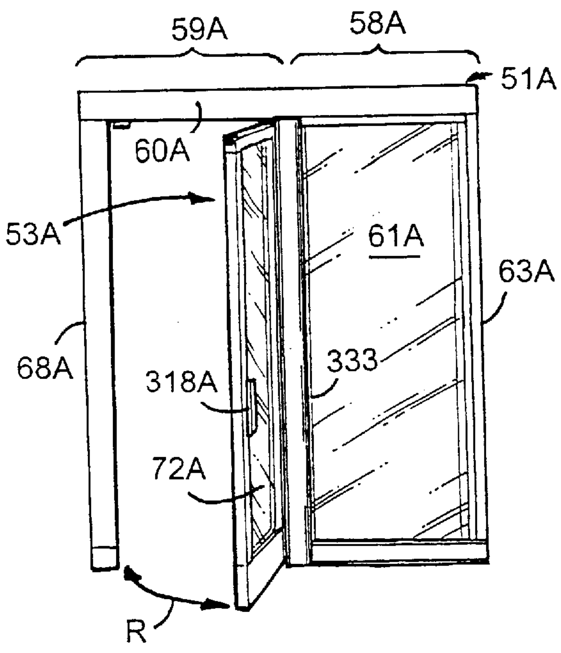
FIG. 17B is a front view similar to FIG. 17A, but with the door broken-away to an outwardly pivoted position.
Figure 17A:
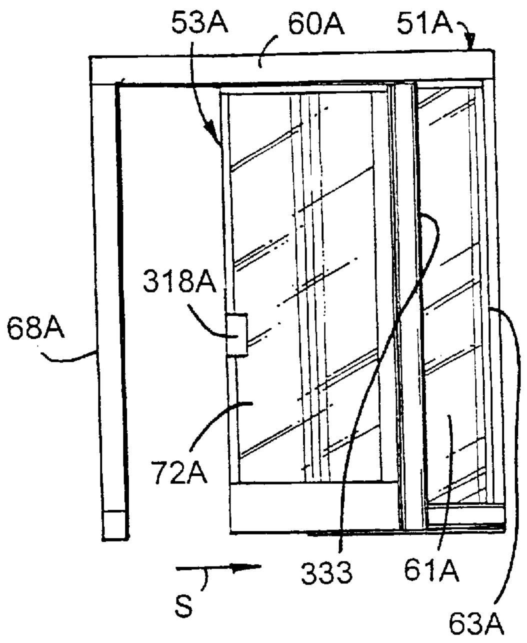
FIG. 17A is a front view of the doorway construction shown in FIG. 16, but with the door slid to a partially open position.

A modified doorway structure 51A (FIGS. 16 and 17) is shown that slidably supports the adjustable door 53A for translational movement along a slide path "S" (FIG. 17A), and further that provides a breakaway latch 329 for allowing the door 53A to pivot outwardly along a rotated path "R" (FIG. 17B) upon the door 53A receiving a predetermined minimum force directed transverse to the path of sliding movement "S". In the modified doorway structure, all components and features that are identical or similar to those discussed above are designated by use of identical numbers, but with the addition of the letter "A" to reduce redundant discussion.

The modified doorway structure 51A (FIG. 17) includes a fixed side portion 58A and a doorway-opening-defining portion 59A, over both of which extends a structural expressway construction or beam 60A. The fixed side portion or sidelite portion 58A includes a window pane 61A framed by a sidelite head 62A, a sidelite fixed/outer jamb 63A, a locking jamb 64A, and a sidelite base 65A. The window pane 61A is made of a light-transmitting material such a glass or the like. The base 65A is adjustably supported by a leveler 66A on a floor track 67A. The doorway defining portion 59A includes a section of the sidelite head 62A, and a hinge or doorjamb 68A. A door-carrying boom 330 includes a trolley 331 that rollingly engages a track 332 in the expressway beam 60A, and a downrigger 333 that extends rigidly downwardly from the trolley 331. The top and bottom door hinges 69A and 70A are supported on an end of the trolley 331 and on a bottom end of the downrigger 333, as described below.

Figure 19:
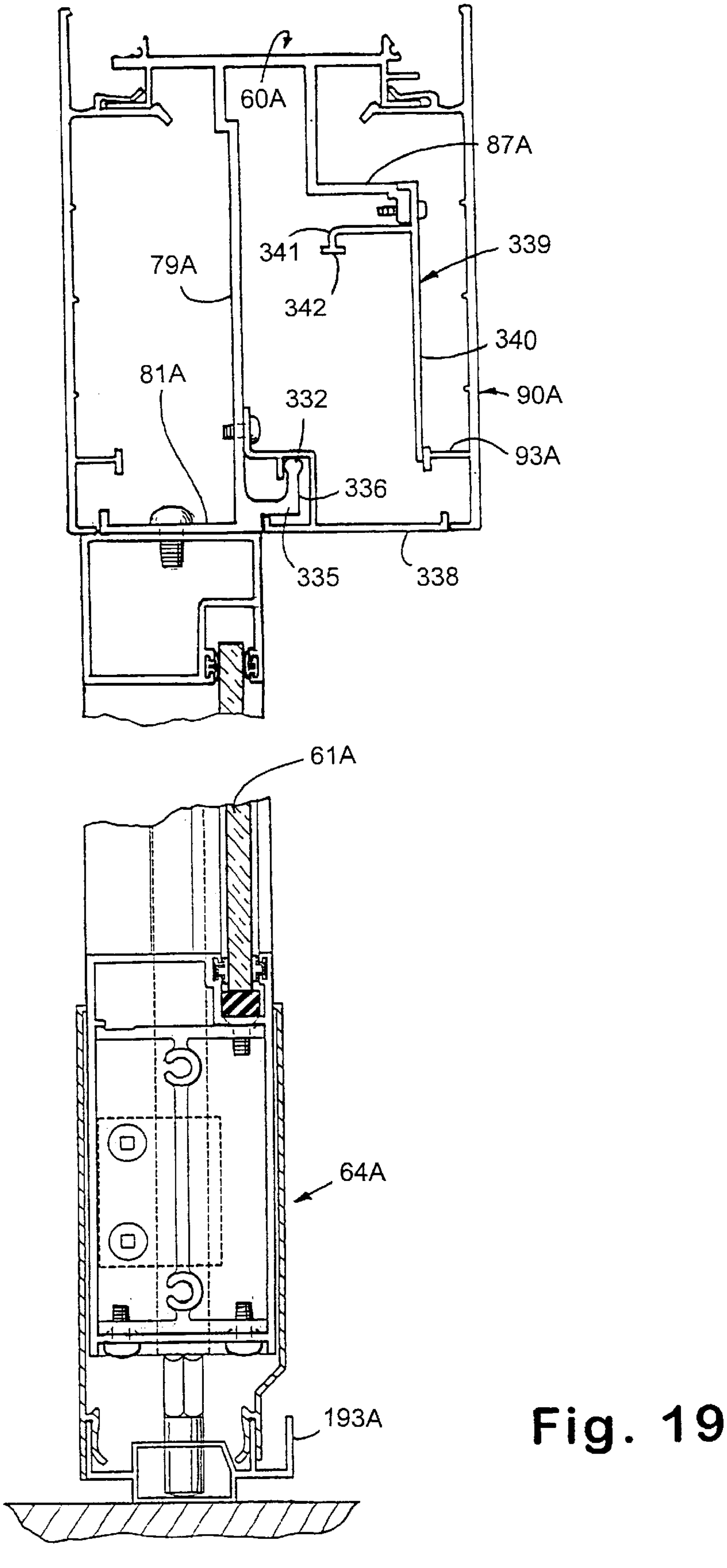
Figure 20:
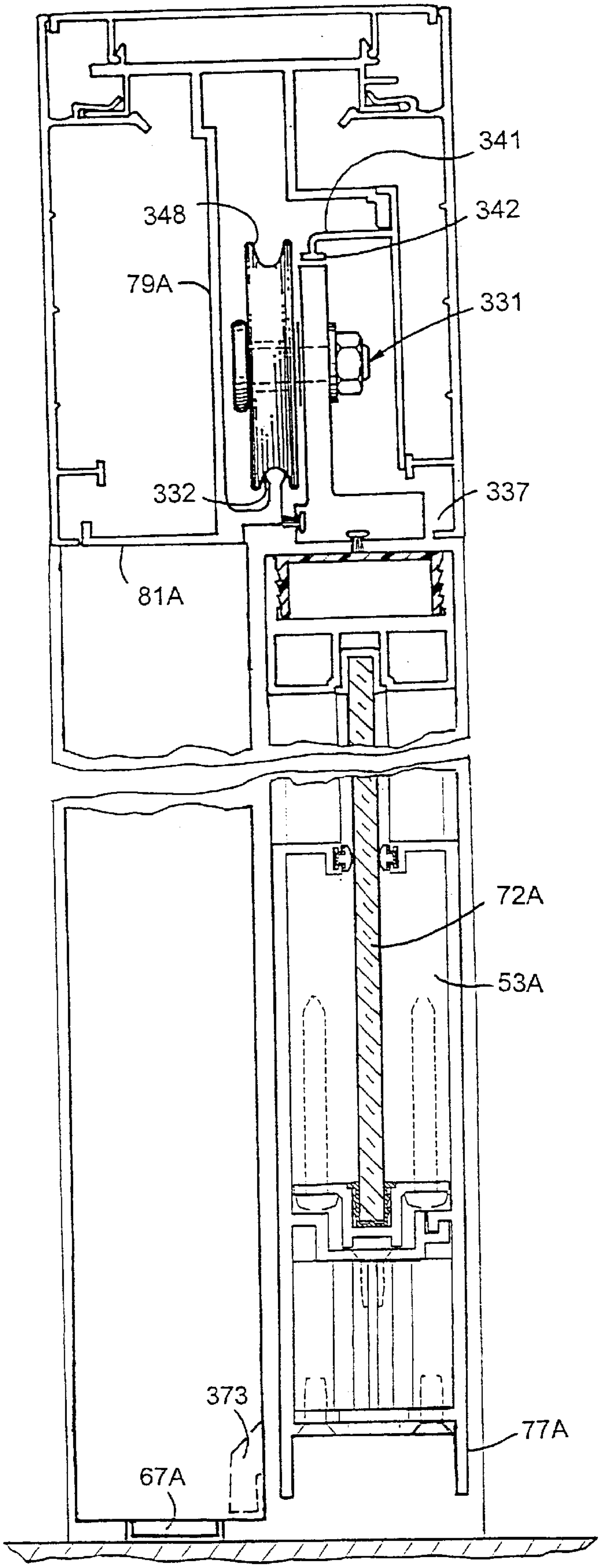

The structural expressway beam 60A (FIG. 19) is very similar to the beam 60, and in fact can be made from the same raw extrusion but with different features machined off of the raw extrusion. The expressway beam 60A includes an L-shaped arm 335 that extends from the bottom of vertical center web 79A just above the bottom web 81A. The up leg 336 of the arm 335 has an enlarged tip forming the track 332 for rollingly receiving a pair of wheels on the trolley 331 (FIG. 20). The front portion of the bottom web 81 is cut away, leaving an opening 337 that allows access upwardly into the area laterally adjacent the vertical center web 79A and adjacent the track 332. Notably a short section (FIG. 19) of the bottom web 81 can be left in place on an end of the expressway beam 60A to act as an end stop to limit the travel of the trolley 331 along the track 332 if desired, or a bracket 338 (FIG. 19) can be attached to partially cover the opening 337. Alternatively, a separate end stop or door stop can be used and still be within the scope of the present invention. An adapter bracket 339 is screwed to the main L leg 87A. The adapter bracket 339 includes a down leg 340 for abutting an inwardly extending bottom leg 93A on the expressway side cover 90A, to hold the side cover 90A in an aligned position. A second leg 341 extends inwardly from adapter bracket 339, and includes a downwardly facing T-shaped hand 342 adapted and positioned close to a top of the trolley 331 to prevent the trolley 331 from jumping upwardly and laterally off of the track 332.

Figure 21:
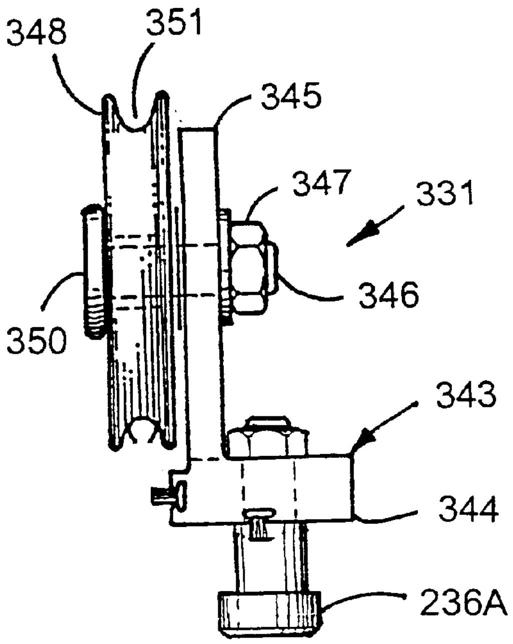
FIG. 21 is an end view of the door-supporting trolley shown in FIGS. 17 and 20.
Figure 21A:
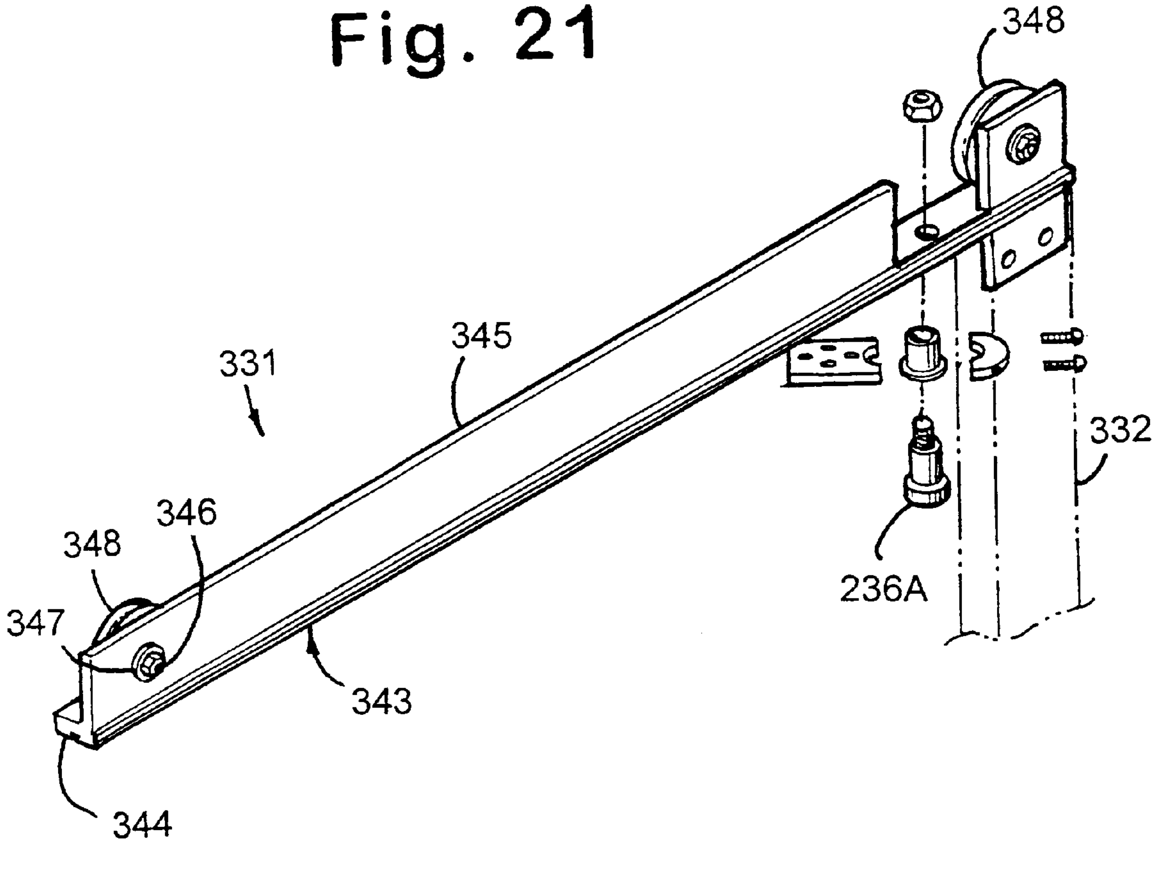
FIG. 21A is an exploded perspective view of the trolley shown in FIG. 21.
Figure 22:
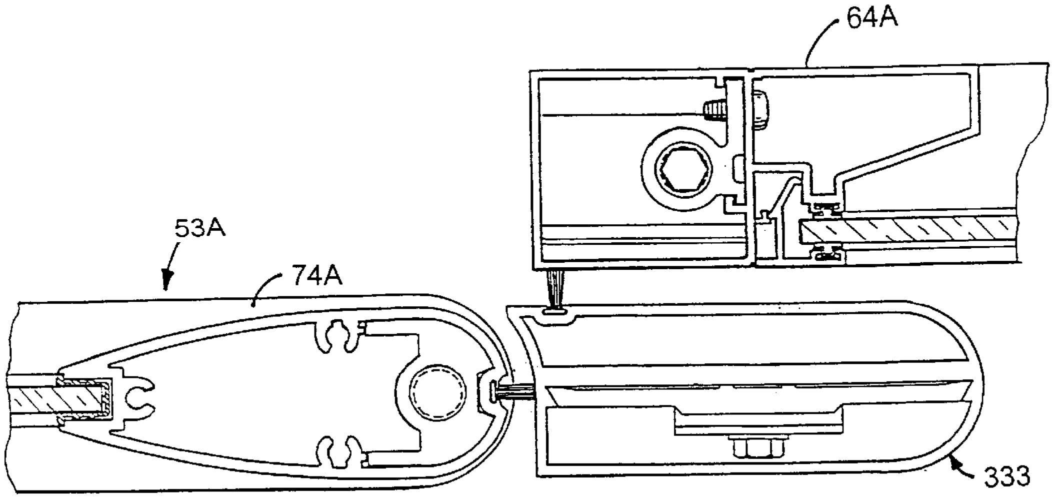
FIG. 22 is an enlarged cross-sectional view of the center area of FIG. 18, including the center jamb of the doorway construction, the downrigger of the door-supporting boom, and the hinge-side stile.
Figure 23:
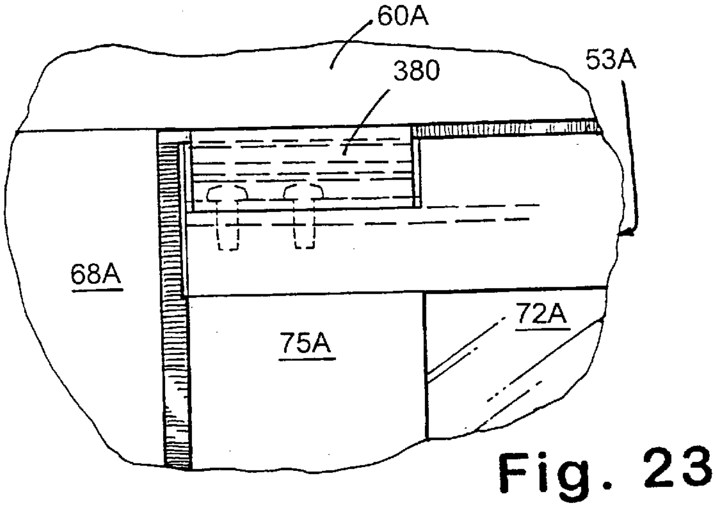
FIG. 23 is an enlarged view of the door corner formed by the hinge-remote stile and the upper door rail, including the breakaway latch.

The trolley 331 (FIGS. 21 and 21A) includes an L-shaped frame 343 having a horizontal lower plate 344 and a vertical side plate 345. The pivot bolt 236A extends through lower plate 344 in a manner that simulates the pivot backer 235 discussed above, thus providing the top hinge 69A. A pair of wheel shafts 346 extend horizontally through the vertical side plate 345, and are secured in place with lock nuts 347. Wheels 348 are rotatably mounted on the laterally extending ends of the wheel shafts 346. The wheels 348 are held on the shafts 346 by headed ends 350. The wheels 348 have a circumferential semicircularly shaped recess 351 formed around their perimeter, the recess 351 being configured to mateably engage the track 332 for secure rolling movement with low risk of lateral movement and disengagement from the track 322.

The downrigger 333 (FIG. 17) includes a bottom hinge plate 352 secured to its bottom end, and a stud 353 extends upwardly from the bottom hinge plate 352 to form the bottom pivot 70A.

Figure 18:
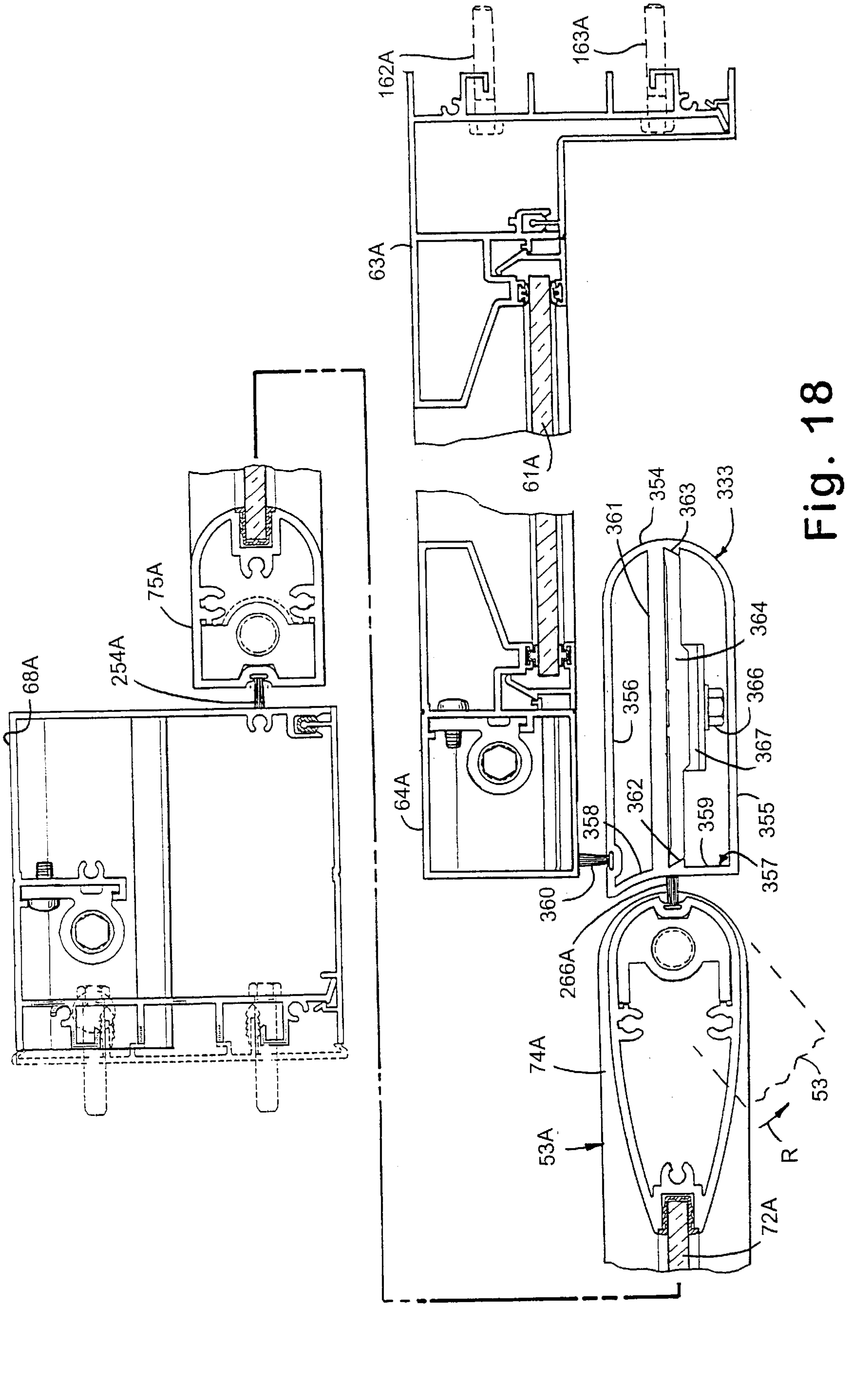
FIGS. 18–20 are cross-sectional views taken along the lines XVIII—XVIII, XIX—XIX, and XX—XX in FIG. 16.

The cross section of the downrigger 333 can be any of a variety of different shapes, the particular present shape being chosen to match the design aesthetics of the stiles 74–75, but also being chosen to minimize light pass-through and to permit pivoting the door 53A under breakaway conditions. Specifically, the present downrigger 333 (FIG. 18) has a rounded end 354, parallel sides 355 and 356, and a door-adjacent end 357 having a curved portion 358 and a straight portion 359. The curved portion 358 is located adjacent the locking jamb 64A, and includes a light brush 360 to prevent light pass-through when the door 53A is closed. The light brush 266A on the hinge stile 75A engages the door-adjacent surface on the downrigger 333, and slides along the curved portion 358 when the door 53A is broken away and is pivoted outwardly in direction R. The straight portion 359 acts as a stop to the door 53A to stop the outwardly pivoting motion of the door 53A, the straight portion 359 providing sufficient surface area to not damage the door 53A ))when stopping the movement of the door 53A. The downrigger 333 further includes a central wall 361 and a pair of notches 362 and 363 at each end of the central wall 361.

Figure 27:
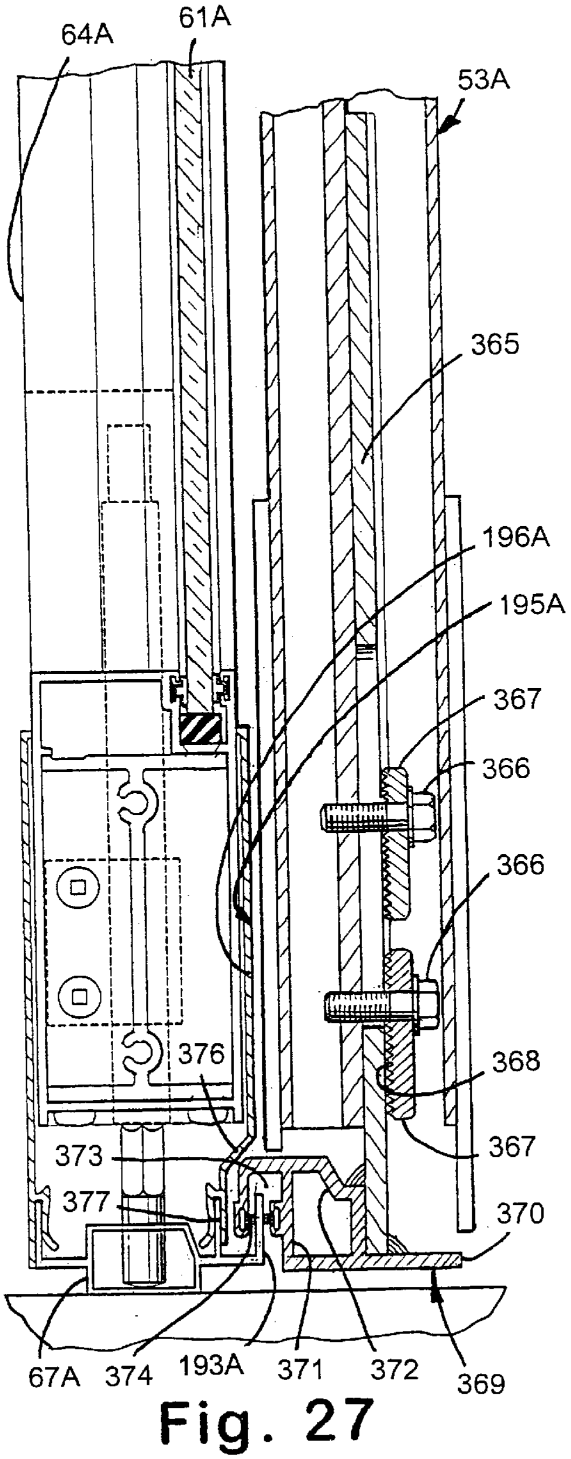
FIG. 27 is a cross-sectional view taken vertically through the downrigger showing a bottom section of the door and the downrigger, and also showing a bottom section of the doorway construction adjacent the door, such as when the door is partially open (see FIG. 17A)
Figure 28:
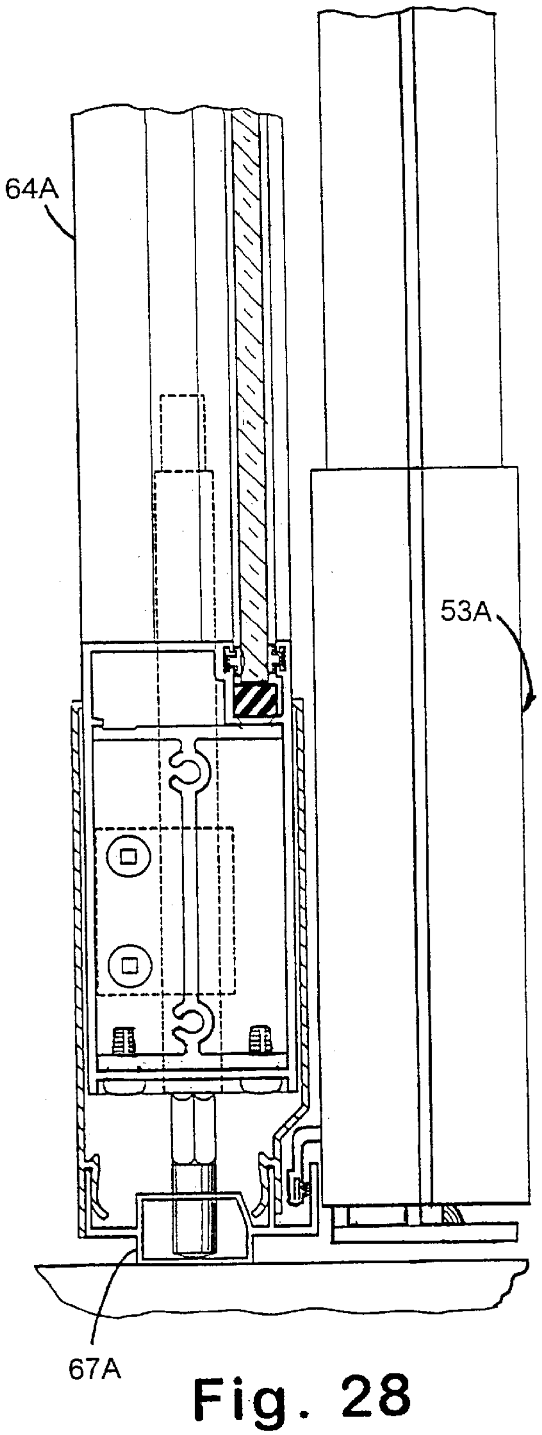
FIG. 28 is a cross-sectional view taken vertically through the doorway construction similar to that shown in FIG. 28, but showing an end of the door.

An adjuster 364 (FIG. 18) includes a vertically adjustable slide plate 365 having edges the slidably engage the notches 362 and 363. A pair of bolts 366 threadably engage the central wall 361, and a pair of locking plates 367 are mounted on the bolts 366. The locking plates 367 (FIG. 27) include serrated or roughened faces 368 for frictionally engaging the side surface of the central wall 361. By loosening the bolts 366, the slide plate 365 can be adjusted vertically to accommodate variations in the height of the door 53. An inverted T-shaped bottom piece 369 is welded to a bottom of the slide plate 365. The bottom piece 369 includes a transverse plate 370, a downwardly facing U-shaped guide 371, and a reinforcement rib 372. The guide 371 defines a recess 373 adapted to matingly slidingly engage the up leg 193A on the floor track 67A. A pair of brushes 374 are mounted on opposing sides of the recess 373 for providing a smoother sliding motion to the door 53A. The brushes 374 also help prevent the door 53A from unexpectedly rolling along the track 332. It is noted that the track 332 could be tilted or a spring mechanism could be provided so that the door 53A naturally moves to a closed position. The base cover 195A has a modified panel 196A that has a bent lower section 376 that accommodates the U-shaped guide 371. Concurrently, the floor track 67A includes an inwardly spaced second up leg 377 for the bottom spring clip 197A to engage.

Figure 24:
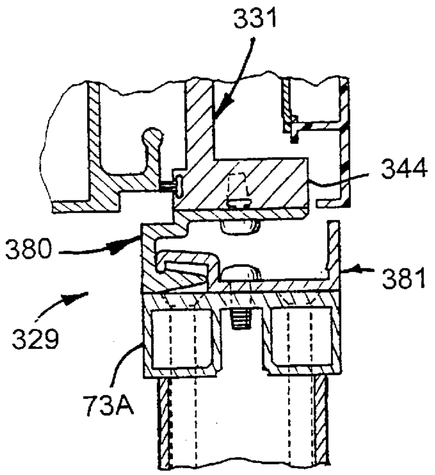
FIG. 24 is a cross-sectional view taken vertically along the lines XXIII—XXIII in FIG. 23.
Figure 25:
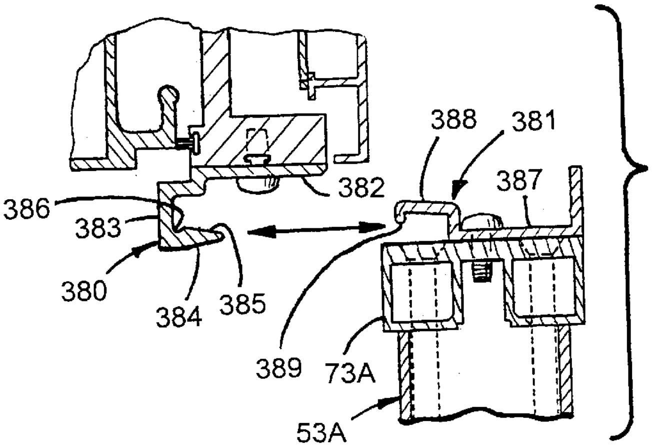
FIG. 25 is a cross-sectional view similar to FIG. 24, but with the breakaway latch shown as broken apart.
Figure 26:
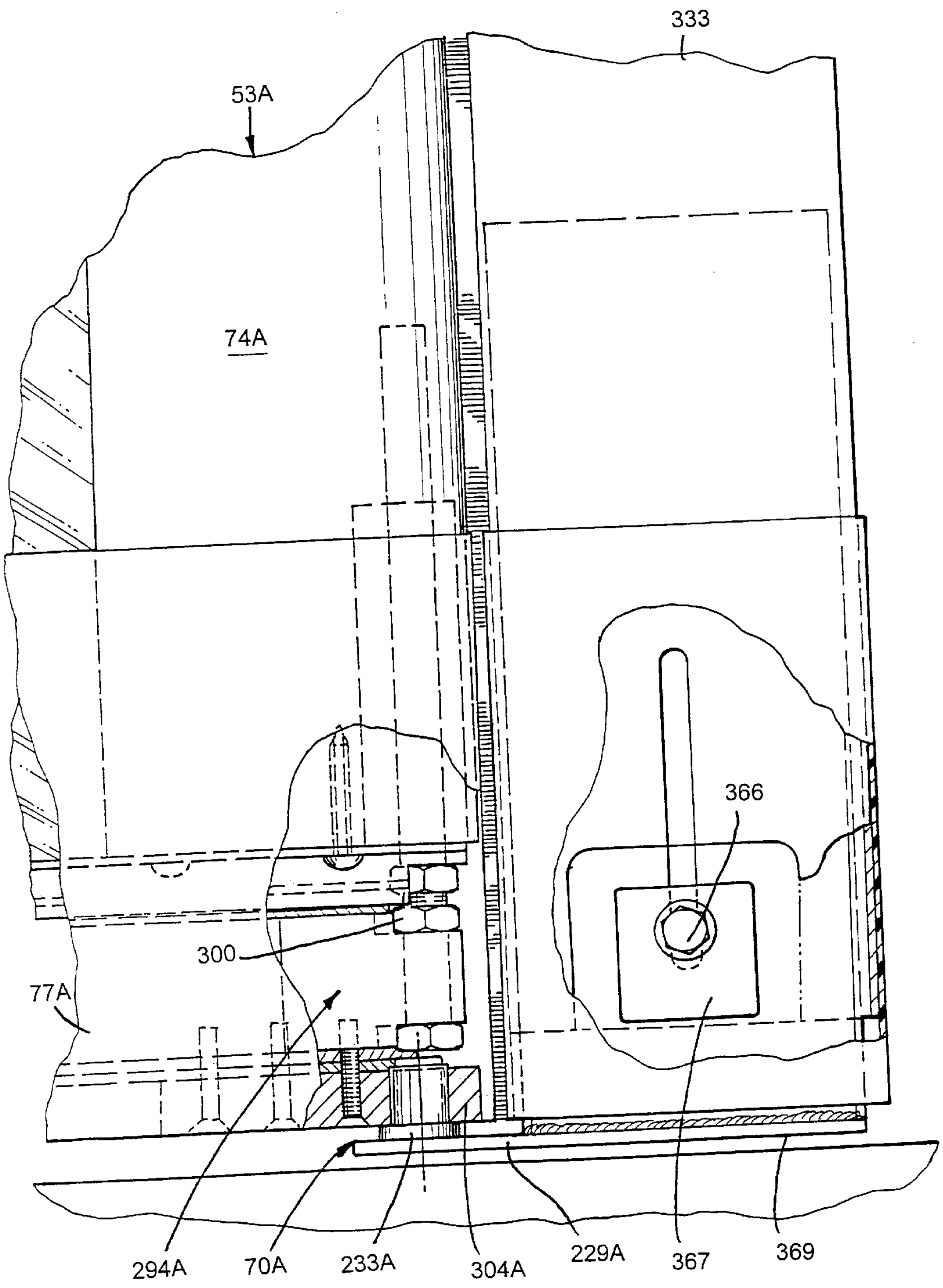
FIG. 26 is an enlarged fragmentary view of the circled area XXVI in FIG. 16.

A breakaway latch 329 (FIG. 24) includes a top latch piece 380 that mounts to a bottom of the lower plate 344 on the trolley 331, and a bottom latch piece 381 that mounts to a top of the top rail 73A of the door 53A. The top latch piece 380 includes an attachment flange 382 (FIG. 25), and a C-shaped arm 383 that extends downwardly, ending in a latch finger 384. The latch finger 384 includes a ramping surface 385 and a detent recess 386. The bottom latch piece 381 includes an attachment flange 387, and an arm 388 that extends upwardly and rearwardly. The arm 388 includes a down lip 389 at its tip. When the door 53A is closed and latched, the down lip 389 is positioned in the detent recess 386 (FIG. 24). When the door 53A is forced outwardly with a predetermined level of force, such as 30+pounds of force, the latch pieces 380 and 381 flex, and break away from each other, allowing door 53A to pivot on top and bottom pivots 69A and 70A (FIG. 25). After the circumstance causing the breakaway force is resolved, the door 53A can be swung manually back to the latched position, in which case the down lip 389 slides up ramping surface 385 until down lip 389 snaps back into detented engagement with the detent recess 386 (FIG. 24). Notably, some local regulations require that sliding doors have a breakaway feature allowing the doors 53A to pivot outwardly in an emergency. The present mechanism provides this feature at a reasonable cost. Further, the present mechanism is manually resettable. Advantageously, the 53A can be used in this modified construction 50A, substantially without significant modification. It is noted that bumpers or other means to control the sliding movement of the door 53A can be provided, including such means as stiff grease in the bearings of the wheels 348, bumpers on the jambs or stiles (in addition to the brushes, which act to soften any impact), rubber on the wheels 348 or track 332, and many other such means.

Door Construction with Interchangeable Solid Door Component

Figure 31:
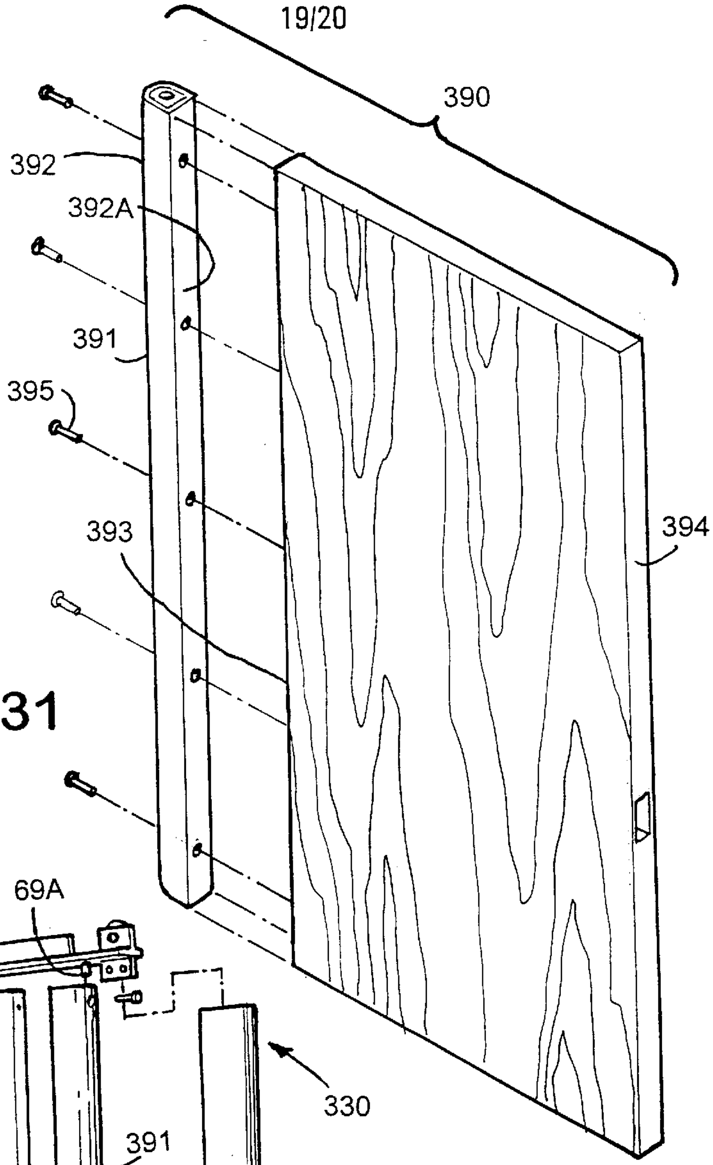
FIG. 31 is an exploded perspective view of a modified door including a hinge stile attached to one end of a solid door panel.

A solid wood (or composite) door 390 (FIG. 31) is contemplated that incorporates many of the concepts noted above. The solid wood door 390 includes an upright extruded or rollformed structural hinge stile 391 having an end surface 392 that replicates the similar end surface 253 of the hinge stile 74. In the solid wood door 390, the structural stile 391 includes a flat side 392A (or side configured to matingly engage an edge 393 of the solid wood panel 394) and is fastened to a vertical side edge 393 of the solid wood (or composite) panel 394 by screws 395. The structural stile 391 is attached between the top and bottom hinges 69 and 70 as previously described.

Figure 31A:
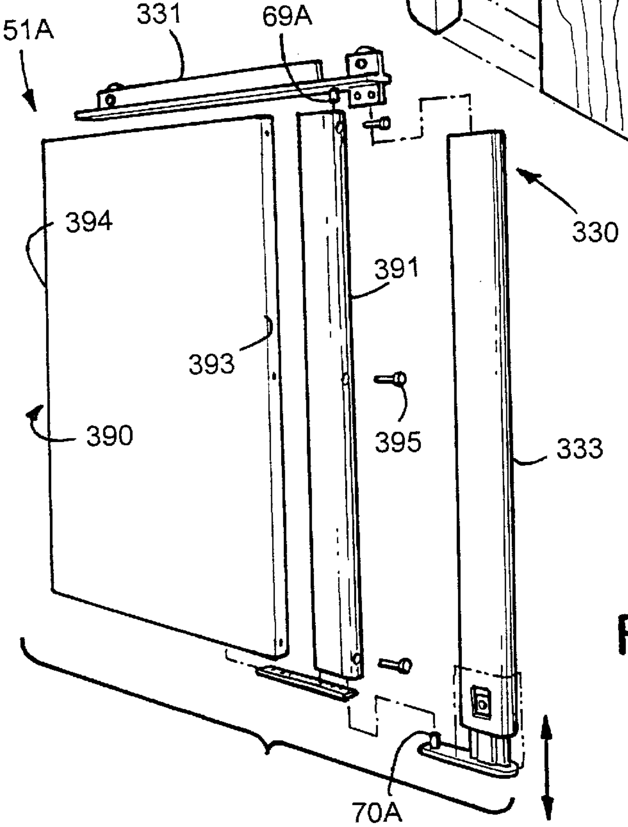
FIG. 31A is an exploded perspective view of the modified door shown in FIG. 31 as mounted to the boom (trolley and downrigger) of FIG. 17 for sliding and breakaway pivoting.

Notably, the solid wood door 390 is also useable in the sliding arrangement of modified doorway-defining structure 51A (FIG. 31A). Specifically, the structural stile 391 is attached to the hinges 69A and 70A on the boom 330, as previously described.

Door Construction with Custom Height

Figure 32:
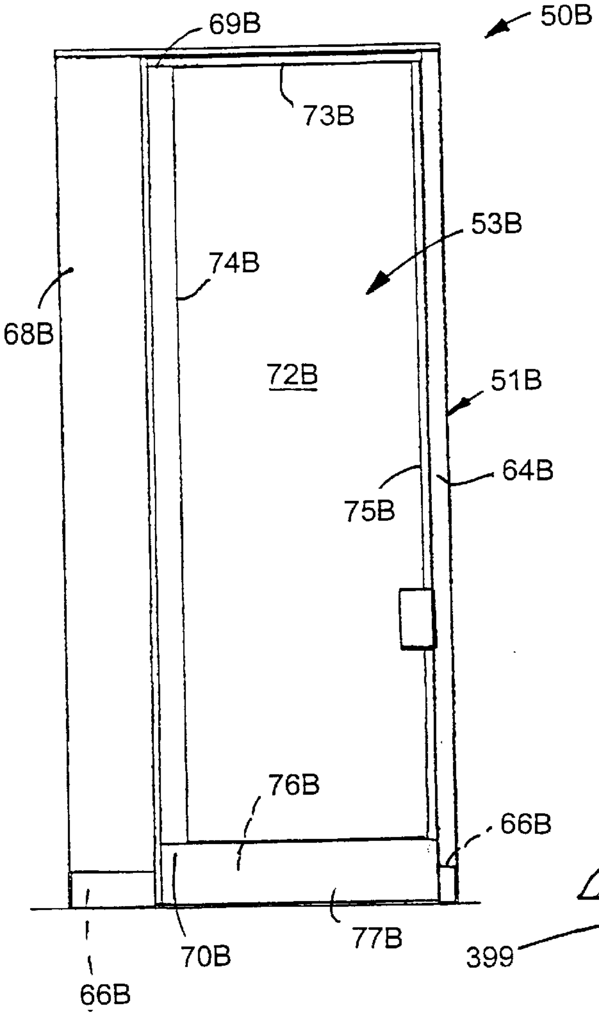
FIG. 32 is a front view of another modified door and doorway construction that extends to a ceiling.

Yet another adjustable door and doorway construction 50B (FIG. 32) is contemplated. In the adjustable door and doorway construction 50B, all identical components and features are identified by using the same numbers, but with the addition of the letter B, in order to reduce redundant discussion.

The adjustable doorway-defining structure 51B includes a latching jamb 64B, a hinge jamb 68B, a header 62B, the jambs 64B and 68B each including levelers 66B.

Figure 33:
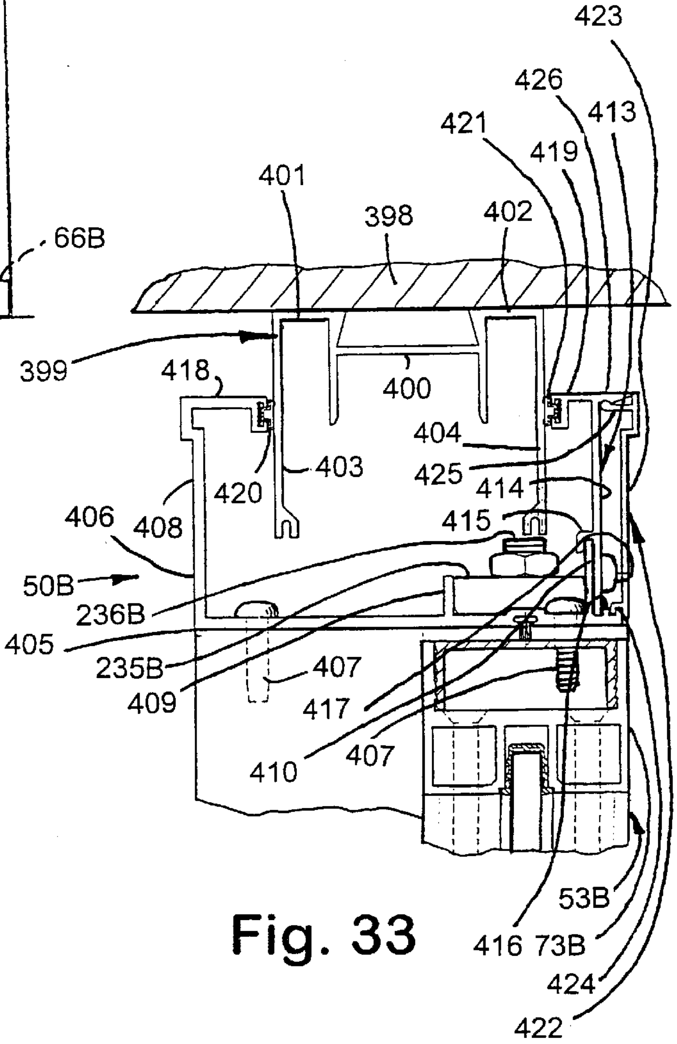
FIG. 33 is an enlarged cross-sectional view of a top of the door and doorway construction shown in FIG. 32.

The adjustable door construction 53B (FIG. 32) includes a glass pane 72B, and a door frame that includes a top rail 73B, a hinge stile 74B, a locking stile 75B, and a floating rail 76B adjustably supported in a bottom rail 77B. The hinge stile 74B is pivoted to top and bottom hinges 69B and 70B, with the majority of the weight of the door 53B being carried by the top hinge 69B, as described below. The door 53B extends upwardly past the expressway area previously described, to an area proximate the building ceiling 398. A ceiling channel 399 (FIG. 33) is attached to the ceiling 398. Ceiling channel 399 includes an H-shaped center section 400. A pair of flat top flanges 401 and 402 extend outwardly and stably engage the ceiling 398, and a pair of down flanges 403 and 404 extend from top flanges 401 and 402.

A U-shaped beam-like section 405 extends across under ceiling channel 399. The ends of the U-shaped beam-like section 405 are supported by adjacent partition panels, an overhead space frame beam system, or by building walls, or other wall structures that are suitably stable and rigid. The beam-like section 405 includes a first structural extrusion 406 having a transverse wall 407 and a vertical wall 408. A pair of up flanges 409 and 410 extend from the transverse wall 407 at a location spaced from vertical wall 408, and a pair of short tabs are formed on horizontal wall 407 adjacent the outermost up flange 410. A second structural extrusion 413 includes a vertical wall 414. A hook 415 on the vertical wall 414 is configured to engage the outermost up flange 410, with a lower tip 416 of the vertical wall 414 engaged in a recess between one of the tabs and the up flange 410. A screw 417 extends through the vertical wall 414 into the up flange 410, and secures the second structural extrusion 413 to the up flange 410. The vertical walls 408 and 414 both include inwardly extending legs 418 and 419, with slides 420 and 421 for slidably engaging the side surfaces of the down flanges 403 and 404 on the ceiling channel 399. A side cover 422 is provided having a body panel 423, a hooked lower connector 424 adapted to grippingly engage the tab 412, and a resilient top connector finger 425 adapted to frictionally engage a detent recess on a lateral arm 426 at the top of the second structural extrusion 413.

The jambs 64B and 68B are secured to the transverse wall 407 by screws 427 in a manner similar to the way in which the jambs 64 and 68 were attached to the bottom web 81 of the expressway beam 60 described above. A pivot backer 235B is set on the transverse wall 407 between the up flanges 409 and 410, and a pivot bolt 236B is extended through the pivot backer 235B into the top rail 73B. The top rail 73B and the pivot bolt 236B are identical to the top rail 73 and pivot bolt 236, such that their assembly need not be described in detail a second time.

In the foregoing description, it will be readily appreciated by those skilled in the art that modifications may be made to the invention without departing from the concepts disclosed here. Such modifications are to be considered as included in the following claims, unless these claims by their language expressly state otherwise.

The invention claimed is:

1. A door construction for positioning in a doorway opening, comprising:

upper and lower door sections, one of the upper and lower door sections including a recess and the other of the upper and lower door sections being telescopingly mounted in the recess; and an adjustment mechanism threadably engaging the upper and lower door sections such that a total height of the door is threadably and continuously adjustable, whereby the upper and lower door sections can be adjusted to provide clearance around the door construction when positioned in the doorway opening.

2. The door construction defined in claim 1 wherein the adjustment mechanism is manually operable and includes an adjuster screw.

3. The door construction defined in claim 1 wherein the lower door section comprises a base with front and rear panels that define the recess.

4. The door construction defined in claim 3 wherein the base is rectangular and box shaped, and the upper door section includes an enlarged bottom rail that slides within the base.

5. The door construction defined in claim 4 wherein the upper door section includes a center panel, and further includes a top rail and side stiles attached to the bottom rail to form a perimeter frame constructed to engage and hold edges of the center panel.

6. The door construction defined in claim 5 wherein the center panel comprises a glass pane.

7. The door construction defined in claim 5 wherein the side stiles have a bullet-shaped curvilinear cross section.

8. A door construction for positioning in a doorway opening, comprising:

upper and lower door sections, one of the upper and lower door sections including a recess and the other of the upper and lower door sections being telescopingly mounted in the recess;

a top hinge attached to the upper door section and configured to bear a weight of the door construction, and a bottom hinge attached to one of the upper and lower door sections and configured to constrain the door construction to a particular axis of rotation but not to bear a significant amount of a weight of the door construction; and an adjustment mechanism operably interconnecting the upper and lower door sections for adjusting a total height of the door, whereby the upper and lower door sections can be adjusted to provide clearance around the door construction when positioned in the doorway opening.

9. The door construction defined in claim 8 wherein the top hinge includes a vertically extending pivot bolt that extends both downwardly into the upper door section and also upwardly above the upper door section.

10. A door construction for positioning in a doorway opening, comprising:

upper and lower door sections, one of the upper and lower door sections including a recess and the other of the upper and lower door sections being telescopingly mounted in the recess;

the upper door section including a solid center panel, a locking stile and a hinge stile, both of the stiles having recesses configured to receive opposite edges of the center panel, and further both stiles having curvilinear side walls that curve inwardly toward the recesses to provide a structurally stiff shape having a modernistic look, the stiles further defining a central plane and the upper and lower door sections defining top and bottom pivots lying on the central plane; and an adjustment mechanism operably interconnecting the upper and lower door sections for adjusting a total height of the door, whereby the upper and lower door sections can be adjusted to provide clearance around the door construction when positioned in the doorway opening.

11. A doorway construction for use in a building space comprising:

a doorway-defining structure defining three sides of a doorway opening and having continuously adjustable levelers for adjusting a height of the doorway-defining structure;

a door movably supported on the doorway-defining structure for closing the doorway opening, the door including a door extender slidably adjustably attached to the door that is adjustable to adjust a size of the door in accordance with a size change related to adjustment of the levelers on the doorway-defining structure; and a top hinge pivotally connecting the door-defining structure and the door, and that is constructed to bear a majority of the weight of the door.

12. The doorway construction defined in claim 11, wherein the door extender includes a base and the door includes a floating rail that mateably engages the base.

13. The doorway construction defined in claim 12 wherein the base is box shaped, and telescopingly receives the floating rail.

14. A doorway construction for use in a building space comprising:

a doorway-defining structure defining three sides of a doorway opening and having levelers for adjusting a height of the doorway-defining structure;

a door movably supported on the doorway-defining structure for closing the doorway opening, the door including a door extender adjustably attached to the door that is adjustable to adjust a size of the door in accordance with a size change related to adjustment of the levelers on the doorway-defining structure;

a top hinge secured to a top of the door, the top hinge including vertically extending pivot bolt that extends into the door and that is constructed to bear a majority of the weight of the door; and wherein the door extender includes a base and the door includes a floating rail that mateably engages the base.

15. The doorway construction defined in claim 11 wherein the door is slidably supported on the doorway-defining structure, the doorway-defining structure includes a guide flange extending along a lower edge of the door, and wherein the door includes a guide slidably engaging the guide flange for guiding the movement of a lower portion of the door during sliding movement of the door.

16. The doorway construction defined in claim 15 wherein the doorway-defining structure has a front face defining a vertical front plane, the guide flange being spaced from the vertical front plane into the doorway-defining structure in a low visibility area, and the door being positioned forwardly from the vertical front plane, and the guide of the door extending through the vertical front plane into operative contact with the guide flange.

17. The doorway construction defined in claim 11 including an overhead track on the doorway-defining structure, wherein the door is slidably supported on the track.

18. The doorway construction defined in claim 17 including a trolley operably engaging the track and attached to the door for supporting the door.

19. A doorway construction for use in a building space comprising:

a doorway-defining structure defining three sides of a doorway opening and having levelers for adjusting a height of the doorway-defining structure, and including an overhead track;

a door movably supported on the doorway-defining structure for closing the doorway opening, the door including a door extender adjustably attached to the door that is adjustable to adjust a size of the door in accordance with a size change related to adjustment of the levelers on the doorway-defining structure, wherein the door is slidably supported on the track;

a trolley operably engaging the track and attached to the door for supporting the door; and a downrigger rigidly secured to the trolley, the door being pivoted at a top hinge to one of the trolley and the downrigger, and being pivoted at a bottom hinge to the downrigger.

20. The doorway construction defined in claim 19 including a breakaway latch configured to prevent the door from pivoting unless a predetermined lateral force is applied to the door, in which circumstance the breakaway latch releases the door to pivot on the top and bottom hinges.

21. The doorway construction defined in claim 20 wherein doorway-defining structure includes a guide flange extending along a lower edge of the door, and wherein the downrigger includes a guide engaging the guide flange.

22. The doorway construction defined in claim 21 wherein the guide is vertically adjustable on the downrigger.

23. The doorway construction defined in claim 11 wherein the doorway-defining structure includes a sidelite construction located laterally adjacent to the doorway opening that is vertically adjustable.

24. A doorway construction for use in a building space comprising:

a doorway-defining structure defining three sides of a doorway opening and having continuously adjustable levelers for adjusting a height of the doorway-defining structure;

a door movably supported on the doorway-defining structure for closing the doorway opening, the door including a door extender slidably adjustably attached to the door that is adjustable to adjust a size of the door in accordance with a size change related to adjustment of the levelers on the doorway-defining structure; and wherein the doorway-defining structure includes a sidelite construction located laterally adjacent to the doorway opening that is vertically adjustable, the door defines a central plane that extends through vertical side edges of the door, and wherein a top pivot includes a pivot bolt positioned in the central plane that extends vertically into a top section of the door between the vertical side edges but adjacent one of the vertical side edges.

25. The doorway construction defined in claim 11 wherein the door includes a center panel, and a door stile and a locking stile that capture opposing sides of the center panel, the door stile and the locking stile having curvilinear side walls that provide a structurally stiff shape, and further that provide a modernistic appearance.

26. The doorway construction defined in claim 25 wherein the door stile and locking stile define a central plane, and wherein the center panel includes a glass pane that is located in the central plane.

27. The doorway construction defined in claim 11 wherein the door defines a central plane that extends through vertical side edges of the doorway-defining structure, and wherein the doorway-defining structure includes a sidelite construction having a glass pane supported therein, the glass pane being offset from the central plane.

28. The doorway construction defined in claim 27 wherein the sidelite construction includes an extendable base for providing vertical height adjustment.

29. Doorway construction for use in a building space comprising:

a doorway-defining structure defining three sides of a doorway opening and having continuously adjustable levelers for adjusting a height of the doorway-defining structure;

a door movably supported on the doorway-defining structure for closing the doorway opening, the door including a door extender slidably adjustably attached to the door that is adjustable to adjust a size of the door in accordance with a size change related to adjustment of the levelers on the doorway-defining structure; and wherein the door define a central plane that extends through vertical side edges of the doorway-defining structure, the doorway-defining structure including a sidelite construction having a glass panel supported therein, the glass pane being offset from the central plane, the sidelite construction includes an extendable base for providing vertical height adjustment, and wherein the door is pivoted about an axis that is located in the central plane of the door.

30. The doorway construction defined in claim 29 wherein the doorway-defining structure defines a bottom pivot that holds a bottom of the door so that the bottom of the door pivots in the central plane, but the bottom pivot being configured to not support a weight of the door.

31. A doorway construction for a freestanding partition system for use in a building space comprising:

a freestanding doorway-defining partition structure defining a doorway opening and a door support track located generally over the doorway opening; and a door including a door support mechanism slidingly engaging the track for sliding movement between a closed position where the door covers the doorway opening and a first open position where the doorway opening is uncovered, the door support mechanism including a manually resettable breakaway latch permitting the door to move to a second open position different from the first open position when a person presses against the door with a predetermined minimum force.

32. The doorway construction defined in claim 31 wherein the breakaway latch includes a first breakaway member mounted on the doorway-defining structure and a second breakaway member mounted on the door.

33. The doorway construction defined in claim 32 wherein one of the first and second breakaway members includes a recess and an angled surface for providing an incline into the recess.

34. The doorway construction defined in claim 31 wherein the door support mechanism includes a trolley rollingly mounted on the track for sliding movement.

35. The doorway construction defined in claim 31 wherein the door supporting mechanism includes a downrigger rigidly attached to the trolley, the downrigger including an adjustable lower pivot for supporting the door, and the door including a height adjuster for adjusting a total height of the door.

36. The doorway construction defined in claim 31 wherein the doorway-defining structure includes a guide flange extending parallel a path of movement of the door, the door including a bottom guide for operably engaging the guide flange.

37. The doorway construction defined in claim 36 wherein the guide flange is inset into a bottom of the doorway-defining structure.

38. A doorway construction for use in a building space comprising:

a freestanding doorway-defining partition structure defining a doorway opening and a door support track located generally over the doorway opening; and a door including a door support mechanism engaging the track for sliding movement between a closed position where the door covers the doorway opening and a first open position where the doorway opening is uncovered, the door support mechanism further pivotally supporting the door for movement to a second open position different from the first open position where the doorway opening is also uncovered.

39. The doorway construction defined in claim 38 wherein the door support mechanism includes a trolley rollingly mounted on the track for sliding movement.

40. The doorway construction defined in claim 39 wherein the door supporting mechanism includes a downrigger attached to the trolley, the downrigger including an adjustable lower pivot for supporting the door.

41. The doorway construction defined in claim 38 wherein doorway-defining structure includes a guide flange extending parallel a path of movement of the door, the door including a bottom guide for operably engaging the guide flange.

42. The doorway construction defined in claim 41 wherein the guide flange is inset into a bottom of the doorway-defining structure.

43. A doorway construction for subdividing a building space comprising:

a freestanding doorway-defining structure defining a doorway opening;

a downrigger operably slidably attached to and supported by the doorway-defining structure, the downrigger defining a top pivot and a bottom pivot;

a door attached to the top and bottom pivots, whereby the door can be assembled for pivotal movement between a fully open pivot position and a fully closed pivot position and sliding movement between a fully open sliding position and a fully closed sliding position; and wherein said door can be pivoted between the fully open and closed pivot positions when the door is at the fully open sliding position and the fully closed sliding position.

44. A kit comprising:

a door having top and bottom pivot-receiving structures thereon;

a freestanding doorway-defining structure including top and bottom fixed pivots constructed to pivotally engage the top and bottom pivot-receiving structures and including an overhead track;

a boom configured for sliding attachment to the overhead track, the boom being constructed for selective attachment to the door to support the door, whereby the door can be assembled for pivotal movement between a fully open pivot position and a fully closed pivot position and sliding movement between a fully open sliding position and a fully closed sliding position; and wherein said door can be pivoted between the fully open and closed pivot positions when the door is at the fully open sliding position and the fully closed sliding position.

45. The kit defined in claim 44 wherein the boom includes top and bottom boom-mounted pivots constructed to pivotally engage the top and bottom pivot-receiving structures to pivotally support the door on the boom.

46. The kit defined in claim 45 including a breakaway latch on the boom for preventing the door from pivoting on the boom unless a predetermined lateral force is applied to the door.

* * * * *